United States Patent
Eichenberger et al.

(10) Patent No.: US 8,521,961 B2
(45) Date of Patent: Aug. 27, 2013

(54) CHECKPOINTING IN SPECULATIVE VERSIONING CACHES

(75) Inventors: Alexandre E. Eichenberger, Chappaqua, NY (US); Alan Gara, Mount Kisco, NY (US); Michael K. Gschwind, Chappaqua, NY (US); Martin Ohmacht, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 12/544,704

(22) Filed: Aug. 20, 2009

(65) Prior Publication Data

US 2011/0047334 A1 Feb. 24, 2011

(51) Int. Cl.
   *G06F 12/00* (2006.01)
(52) U.S. Cl.
   USPC .... 711/141; 711/118; 711/144; 711/E12.022; 711/E12.026
(58) Field of Classification Search
   None
   See application file for complete search history.

(56) References Cited

U.S. PATENT DOCUMENTS

| | | | |
|---|---|---|---|
| 6,438,677 B1 | 8/2002 | Chaudhry et al. | |
| 6,457,104 B1 | 9/2002 | Tremaine et al. | |
| 6,587,937 B1 | 7/2003 | Jensen et al. | |
| 7,082,601 B2 | 7/2006 | Ohsawa et al. | |
| 7,321,989 B2 | 1/2008 | Grayver | |
| 7,395,418 B1 | 7/2008 | Caprioli et al. | |
| 7,404,041 B2 | 7/2008 | Gara et al. | |
| 7,444,544 B2 | 10/2008 | Bose et al. | |
| 7,606,979 B1* | 10/2009 | Rozas et al. | 711/141 |
| 2003/0126375 A1 | 7/2003 | Hill et al. | |
| 2003/0217080 A1 | 11/2003 | White et al. | |
| 2004/0154019 A1* | 8/2004 | Aamodt et al. | 718/102 |
| 2005/0120179 A1 | 6/2005 | Akkary et al. | |
| 2005/0154944 A1 | 7/2005 | Reinhardt et al. | |
| 2005/0262301 A1 | 11/2005 | Jacobson et al. | |
| 2006/0085588 A1 | 4/2006 | Rajwar et al. | |
| 2006/0195648 A1 | 8/2006 | Chandrasekaran et al. | |
| 2007/0186053 A1* | 8/2007 | Chaudhry et al. | 711/141 |
| 2008/0016393 A1* | 1/2008 | Bose et al. | 714/8 |

(Continued)

FOREIGN PATENT DOCUMENTS

EP  1 643 371 A2  4/2006
WO  WO 2008/088931 A2  7/2008

OTHER PUBLICATIONS

ISR and Written Opinion mailed Oct. 4, 2010 for International Application No. PCT/US2010/042383, 8 pages.
USPTO Application U.S. Appl. No. 12/543,688, 1 page.

(Continued)

*Primary Examiner* — Reginald Bragdon
*Assistant Examiner* — Thanh D Vo
(74) *Attorney, Agent, or Firm* — Stephen J. Walder, Jr.; William Stock

(57) ABSTRACT

Mechanisms for generating checkpoints in a speculative versioning cache of a data processing system are provided. The mechanisms execute code within the data processing system, wherein the code accesses cache lines in the speculative versioning cache. The mechanisms further determine whether a first condition occurs indicating a need to generate a checkpoint in the speculative versioning cache. The checkpoint is a speculative cache line which is made non-speculative in response to a second condition occurring that requires a rollback of changes to a cache line corresponding to the speculative cache line. The mechanisms also generate the checkpoint in the speculative versioning cache in response to a determination that the first condition has occurred.

24 Claims, 11 Drawing Sheets

(56) References Cited

U.S. PATENT DOCUMENTS

| | | |
|---|---|---|
| 2008/0021934 A1 | 1/2008 | Hudson et al. |
| 2008/0172548 A1 | 7/2008 | Caprioli et al. |
| 2010/0122036 A1 | 5/2010 | Radovic et al. |

OTHER PUBLICATIONS

Ceze, Luis et al., "Bulk Disambiguation of Speculative Threads in Multiprocessors", IEEE, Proceedings of the 33rd International Symposium on Computer Architecture (ISCA'06), 2006, 12 pages.

Gopal, Sridhar et al., "Speculative Versioning Cache", Proceedings of the 4th International Symposium on High-Performance Computer Architecture, Jan. 31 to Feb. 4, 1998, pp. 1-11.

International Preliminary Report on Patentability dated Mar. 1, 2012 for International Application No. PCT/US2010/042383, 7 pages.

Eichenberger, Alexandre E. et al., "Version Pressure Feedback Mechanisms for Speculative Versioning Caches", U.S. Appl. No. 12/543,688, filed Aug. 19, 2009.

Notice of Allowance mailed Nov. 8, 2012 for U.S. Appl. No. 12/543,688; 6 pages.

Response to Office Action filed with the USPTO on Oct. 5, 2012 for U.S. Appl. No. 12/543,688, 16 pages.

Office Action mailed Jul. 6, 2012 for U.S. Appl. No. 12/543,688; 11 pages.

* cited by examiner

FIG. 5

```
if (spawn-conditions &&
    other-profitablity-metrics &&
    version-pressure < threshold)
    spawn(work( i+1));
work( i );
```

FIG. 6

```
if (spawn-conditions)
    n = AmountOfWork(versionPressure,
            otherMetrics)
    spawn(work(i+1,...,i+n));
work( i );
```

FIG. 7

```
while (i=getWork())
    if (pressure-too-high) wait;
    work( i );
```

FIG. 8

Traditionally:

```
for(i=0, i<N; i++) {
    workNonGuarded(i);
    StartTransaction()
    workGuarded(i);
    CommitTransaction();
}
```

Conditional Aggregation:

```
inTM = 0;
clearSpecStats();
for(i=0, i<N; i++) {
    workNonGuarded(i);
    if (! inTM) StartTransaction();
    workGuarded(i);
    if (inTM>Threshold || pressure-too-high)
        CommitTransaction();
        clearSpecStats();
}
```

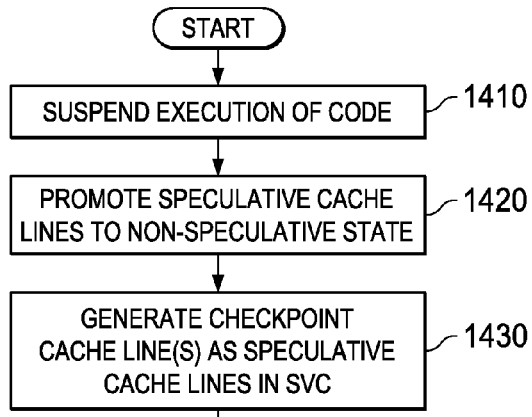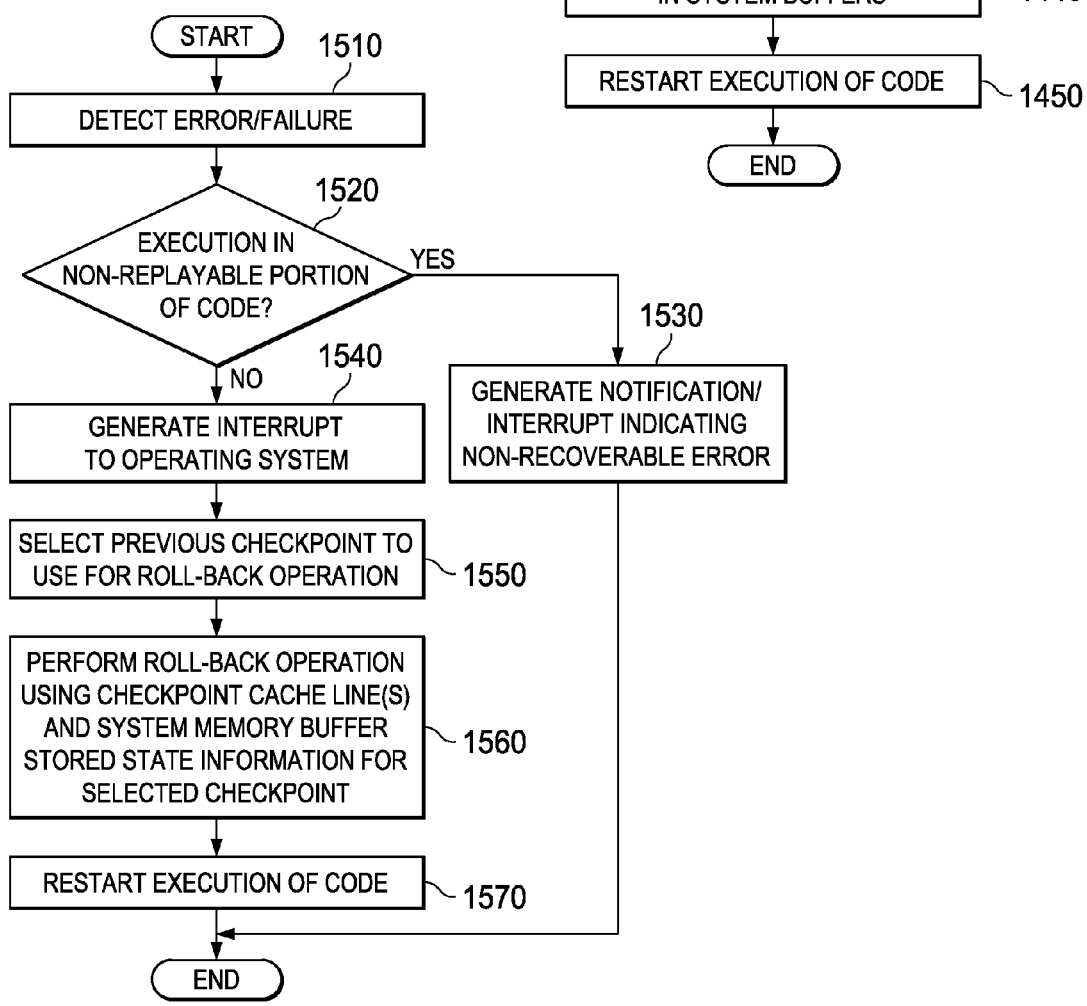

CHECKPOINTING IN SPECULATIVE VERSIONING CACHES

This invention was made with United States Government support under Contract No. B554331 awarded by the Department of Energy. The Government has certain rights in this invention.

BACKGROUND

The present application relates generally to an improved data processing apparatus and method and more specifically to performing checkpointing in speculative versioning caches, and in some embodiments performing such checkpointing based on version pressure feedback mechanisms for such speculative versioning caches.

Speculative versioning caches are cache memory structures that are capable of storing multiple versions of a cache line to enable speculative execution of threads in a multithreading data processing environment. Speculative execution of threads is an optimization technique by which early execution of a thread, whose results may or may not be later needed, is performed so as to achieve greater performance should that thread's results be needed during the execution of the code, i.e. should the thread be transitioned from a speculative state to a non-speculative state in which the results are used. A speculative versioning cache is an extension of a typical cache, where the speculative versioning cache is capable of holding data which is accessible only to the hardware thread that wrote it. All modified annotated cache lines can be discarded atomically using a special command (Abort), or made architecturally visible to other threads using another command (Commit).

Depending on the mode, it is possible that data, written by a hardware thread while executing a speculative task, can also be accessed by other threads that are executing tasks that correspond to logical successor tasks. Thus, speculative versioning requires the tracking of the program order among multiple buffered versions of a memory location to guarantee certain sequential program semantics. First, a load must eventually read the value created by the most recent store to the same memory location. This requires that the load must be squashed and re-executed if it executes before the store and incorrectly reads the previous version. Moreover, this requires that all stores to the same memory location that follow the load in program order must be buffered until the load is executed. Second, a memory location must eventually have the correct version of data independent of the order of the creation of the versions. Consequently, the speculative versions of a location must be committed to the architected storage in program order.

Speculative versioning caches support speculative multithreading by providing the ability to store speculative versions of cache lines in association with the speculative threads. One example of a speculative versioning cache is described in Gopal et al., "Speculative Versioning Cache," Proceedings of the $4^{th}$ International Symposium on High-Performance Computer Architecture, Jan. 31 to Feb. 4, 1998, page 195.In this example of a speculative versioning cache, a private cache is provided for each processor with the system being organized similar to a snooping bus-based cache coherent symmetric multiprocessors (SMP). Memory references that hit in the private cache do not use the bus as in an SMP. Task commits do not write back speculative versions en masse. Each cache line is individually handled when it is accessed the next time.

With the speculative versioning cache described in Gopal et al., programs are partitioned into fragments called tasks which form a sequence corresponding to their order in the dynamic instruction stream. A higher level control unit predicts the next task in the sequence and assigns it to a free processor for execution. Each processor executes the instructions in the task assigned to it and buffers the speculative state created by the task in its private cache. When a task misprediction is detected, the speculative state of all the tasks in the sequence including and after the incorrectly predicted task are invalidated and the corresponding processors are freed. This is referred to as a task squash. The correct tasks in the sequence are then assigned for execution. When a task prediction has been validated, it commits by copying the speculative buffered state to the architected storage, e.g., data cache. Tasks commit one by one in the program order. Once a task commits, its processor is free to execute a new task. Since the tasks commit in program order, tasks are assigned to the processors in program order.

A task executes a load as soon as its address is available, speculating that stores from previous tasks in the sequence do not write to the same location. The closest previous version of the location is supplied to the load. A load that is supplied a version from a previous task is recorded to indicate a use before a potential definition. If a definition, e.g., a store to the same location from a previous task, occurs, the load was supplied with an incorrect version and memory dependence was violated.

When a task executes a store to a memory location, it is communicated to all later active tasks in the sequence. When a task receives a new version of a location from a previous task, it squashes if a use before definition is recorded for that location, i.e. a memory dependence violation is detected. All tasks after the squashed task are also squashed as one a task mis-prediction.

The oldest active task is non-speculative and can commit its speculative memory state, i.e. versions created by stores from this task, to architected storage. Committing a version involves logically copying the versions from the speculative buffers to the architected storage, e.g., data cache. When a task is squashed, the speculative state associated with a task is invalidated and not committed to architected storage.

The private caches of the various processors together constitute the speculative versioning cache. Each cache line of the private caches stores an address tag (Tag) that identifies the data that is cached, a valid bit (V) that identifies whether the cache line is valid or not, a dirty bit (S) that identifies whether a store to the cache line has occurred or not, the data itself, a load bit (L) that identifies whether a task loads from the cache line before storing to the cache line occurs, a pointer (Pointer) that identifies the processor (or L1 cache) that has the next copy/version, if any, in a version ordering list (VOL) for the cache line, and the data itself (Data).

The speculative versioning cache uses combinational logic, referred to as the version control logic (VCL), that provides support for speculative versioning using the VOL. A processor request that hits in the private cache of the processor does not need to consult the VOL. Cache misses issue a bus request that is snooped by the private caches. The states of the requested cache line in each private cache and the VOL are supplied to the VCL. The VCL uses the bus request, the program order among the tasks, and the VOL to compute appropriate responses for each cache. Each cache line is updated based on its initial state, the bus request, and the VCL response.

With speculative execution of threads in a multithreading data processing environment, threads are permitted to execute until there is a dependency violation between two or more threads, e.g., a first thread executes a read of an memory location following by a second thread, that is younger than the first thread, executing a write of the same memory location, or a conflict in which two or more threads attempt to modify the state of the same portion of data in the cache or memory, is encountered. Typically, at this point, one of the threads is permitted to persist its state while the other thread(s) must be squashed, i.e. all work performed by the thread that has not been persisted is rolled-back or aborted. Such squashing of threads is significantly more expensive than a typical cache miss as it results in cancelling all of the work performed by a given speculative thread and possibly all of the work performed by any successor speculative threads as well.

SUMMARY

In one illustrative embodiment, a method, in a data processing system, for generating checkpoints in a speculative versioning cache of the data processing system. The method comprises executing, by at least one processor of the data processing system, code within the data processing system, wherein the code accesses cache lines in the speculative versioning cache. The method further comprises determining, by the data processing system, whether a first condition occurs indicating a need to generate a checkpoint in the speculative versioning cache. The checkpoint is a speculative cache line which is made non-speculative in response to a second condition occurring that requires a roll-back of changes to a cache line corresponding to the speculative cache line. The method further also comprises generating the checkpoint in the speculative versioning cache in response to a determination that the first condition has occurred.

In other illustrative embodiments, a computer program product comprising a computer recordable medium having a computer readable program recorded thereon is provided. The computer readable program, when executed on a data processing system, causes the data processing system to perform various ones, and combinations of, the operations outlined above with regard to the method embodiment.

In yet another illustrative embodiment, a data processing system/apparatus is provided that comprises one or more processors, a speculative versioning cache storage device coupled to the one or more processors, and a hardware implemented global versioning cache module coupled to the speculative versioning cache storage device. Each processor has at least one thread level versioning cache module implemented in hardware of the processor. The one or more processors execute code that accesses cache lines in the speculative versioning cache storage device. At least one of the hardware implemented global versioning cache module or the at least one thread level versioning cache module determines whether a first condition occurs indicating a need to generate a checkpoint in the speculative versioning cache. The checkpoint is a speculative cache line, which is made non-speculative in response to a second condition occurring that requires a rollback of changes to a cache line corresponding to the speculative cache line. Code executing on one of the one or more processors generates the checkpoint in the speculative versioning cache storage device in response to a determination that the first condition has occurred.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 is an example portion of code illustrating a thread throttling action for addressing version pressure in accordance with one illustrative embodiment;

FIG. 6 is an example portion of code illustrating a workload throttling action for addressing version pressure in accordance with one illustrative embodiment;

FIG. 7 is an example portion of code illustrating an idling thread action for addressing version pressure in accordance with one illustrative embodiment;

FIG. 8 is an example diagram illustrating a transaction aggregation action for addressing version pressure in accordance with one illustrative embodiment;

FIG. 14 is a flowchart outlining an example operation for generating checkpoints in accordance with one illustrative embodiment; and FIG. 15 is a flowchart outlining an example operation for performing a rollback operation in accordance with one illustrative embodiment.

DETAILED DESCRIPTION

Figure 1:
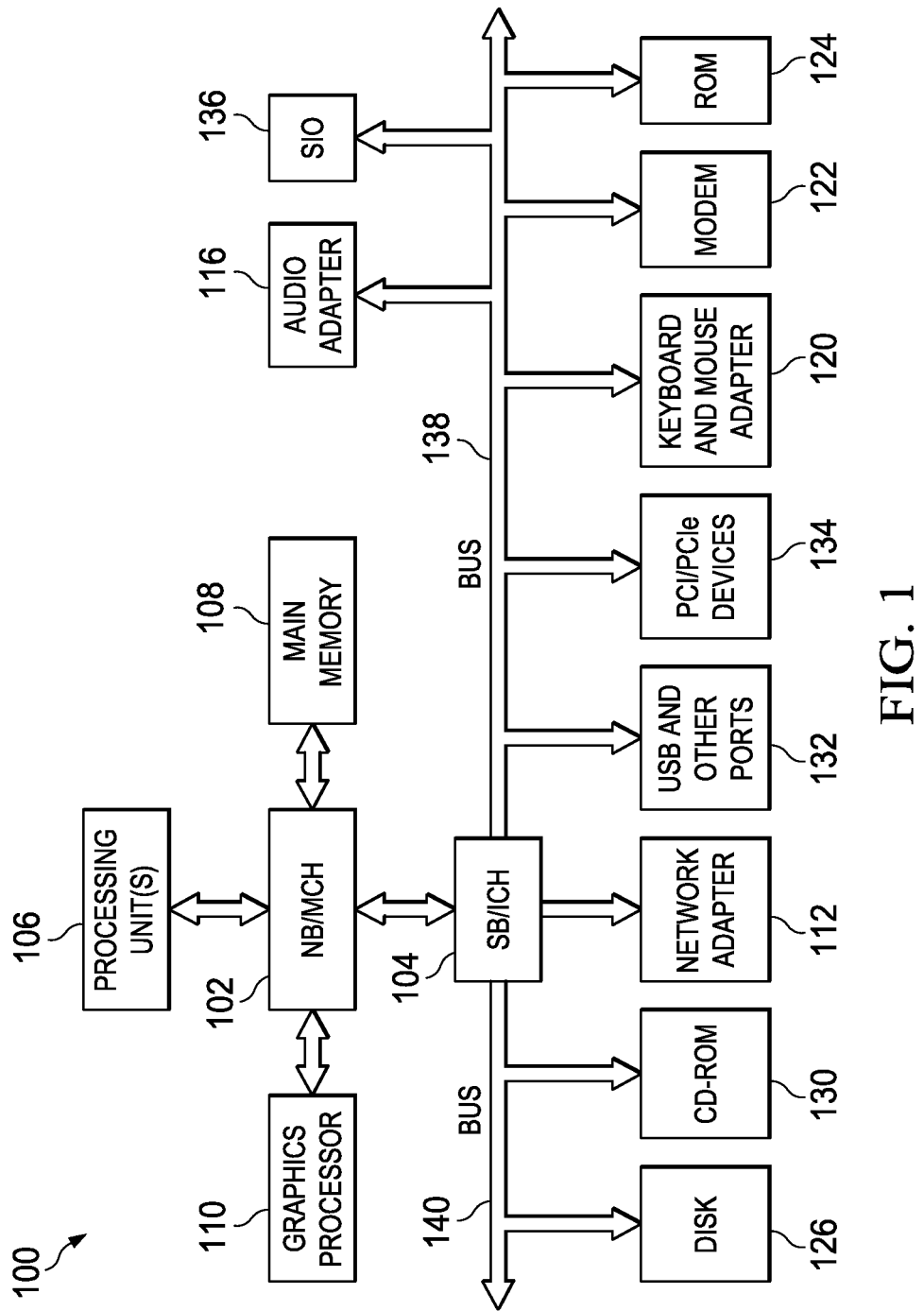
FIG. 1 is an example block diagram of a data processing system is shown in which illustrative embodiments may be implemented.

The illustrative embodiments provide mechanisms for determining version pressure within speculative versioning caches (SVCs) and utilizing that version pressure information to affect changes in the way in which code is executed so as to increase/decrease the version pressure to achieve optimum performance of the speculative versioning cache. In addition, the illustrative embodiments further provide mechanisms for utilizing the speculative versioning cache to store checkpointing information for purposes of rolling back modifications where necessary. Moreover, the illustrative embodiments provide mechanisms for utilizing version pressure information and maximum capacity information for checkpointing information to determine when to promote speculative states to non-speculative states and generate a new checkpoint.

As mentioned above, with speculative versioning caches (SVCs), multiple versions of a cache line are preserved in the SVC. An SVC cache is organized with a given number of cache line sets, each cache line set having a given number of cache lines (the associativity number). When processing a memory request, the address is used to determine to which cache line set this address belongs. Once the cache line set is determined, the cache determines if the cache line that is associated with the given address is present or not in the determined cache line set. To do so, the cache accesses the tags (i.e. meta information that indicates the address and version corresponding to the cache lines presently in the cache line set) to determine if a cache hit (correct address and version being present) or cache miss (none of the cache lines correspond to the requested address/version currently in this cache line set) occurs.

With speculative versioning caches (SVCs), if there is an access violation, e.g., a dependency violation, threads or transactions may be squashed resulting in considerable overhead costs. In addition, threads may be squashed due to conflict misses. Conflict misses occur when there is not enough storage in the SVC for all of the current versions of a cache line. The likelihood of a conflict miss is increased by the fact that, unlike normal cache structures, with an SVC, cache lines with a speculative state cannot be evicted from the SVC since they typically are not backed in architecture storage, e.g., the data cache or main memory. Thus, if a cache line with a speculative state must be evicted, such as to provide additional storage space for other speculative threads, then the speculative thread associated with the evicted speculative state cache line must be squashed. Moreover, when a thread is squashed, typically all child threads are also squashed. Child threads correspond to threads executing tasks that are logically after the current thread's task in the original program order. With the squashing of threads and child threads, a large overhead cost, due to the utilization of resources with no beneficial result being generated, and the need to restart the squashed threads, may be encountered when there are conflict misses.

The likelihood of a conflict miss occurring increases with the number of threads executing in the data processing system. Moreover, applications having "hot spot" characteristics, i.e. portions of the application that are executed often, may greatly increase the likelihood of a conflict miss since such hot spots increase the number of versions of the cache lines for these hot spots that need to be maintained in the SVC. If there are a large number of cache line sets, the likelihood of a conflict miss may be reduced, in the absence of hot spots, as memory accesses with uniform distributions will be distributed in a larger number of cache sets and thus, decrease the number of speculative memory requests that compete for a given number of cache lines within each cache line set in the cache. In addition, if the cache is organized with a higher degree of associatively, the likelihood of a conflict miss will decrease since high associativity caches provide more cache lines in each cache line set. Thus, each cache line set will be able to accommodate more speculative versions.

While software can control the level of speculation, there is currently no effective mechanism for the software to know how likely a conflict miss situation is to occur. In other words, the software mechanisms, be it a complier, operating system, runtime environment, or the like, cannot evaluate the "version pressure" experienced by the speculative version cache. In the context of the present description, the term "version pressure" refers to the likelihood that a speculative versioning cache will not have sufficient storage space to store all of the various versions of the cache lines necessary to support speculative execution of the threads in the data processing system.

For example, for a given cache line set X in a speculative versioning cache with a set associativity of 16, if there are no speculative cache lines within the 16 cache lines present in cache line set X, then the version pressure is said to be null. If, however, there are 15 speculative lines within the 16 cache lines in cache line set X, then the version pressure is said to be very high. Thus, the term "version pressure" corresponds to a metric proportional to the fraction of speculative cache lines in a given cache line set, or by extension, in the entire speculative versioning cache.

The illustrative embodiments provide a mechanism for providing version pressure feedback for speculative versioning caches. In one illustrative embodiment, a hardware mechanism is provided for generating pressure feedback information on a per-thread or per-cache version pressure module basis and providing such pressure feedback information to a software mechanism, such as a compiler, operating system, runtime environment, or the like, so that the software mechanism can react accordingly. The software mechanism may react in any of a number of different ways. For example, the software mechanism may, based on the pressure feedback information, control the number of active threads, control the amount of work within spanned threads, or control the duration of transactions. Transactions are tasks whose changes must occur atomically, i.e. where either all the changes occur or none of the changes occur. In a transactional model, the decision of whether allowing the change to occur or not depends on whether other tasks and/or transactions touched some of the same data accessed by this task. When no other tasks and/or transactions touched the data associated with the given transaction, then the transaction's changes are allowed to be reflected in the non-speculative state. When some other tasks and/or transactions touched some of the data also touched by the given transaction, then the given transaction may fail, and or the other transactions that touched some of the same data will fail. Changes performed by failing transactions must not be allowed to be committed in the non-speculative state.

With the basic mechanism of the illustrative embodiments, each thread of a data processing system has an associated thread version pressure module. The speculative versioning cache further has an associated global version pressure module. The global version pressure module maintains and updates version pressure information for sets of cache lines, i.e. a set of different versions of the same cache line, present in the speculative version cache. Such version pressure information is updated in response to a cache line miss or cache line replacement operation. The information for the set of cache lines is then propagated from the global version pressure module to individual thread pressure version modules of the individual threads along with data returned from a version of the cache line in response to a request from the thread. Thus, the individual threads' associated version pressure modules receive the version pressure information for the particular sets of cache lines that are accessed by the particular threads. Based on the version pressure information maintained in the individual thread version pressure modules, software mechanisms may perform, for each individual thread, one or more of the various modifications to the execution of threads noted above.

As will be appreciated by one skilled in the art, the present invention may be embodied as a system, method, or computer program product. Accordingly, various aspects and features of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the various aspects and features of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
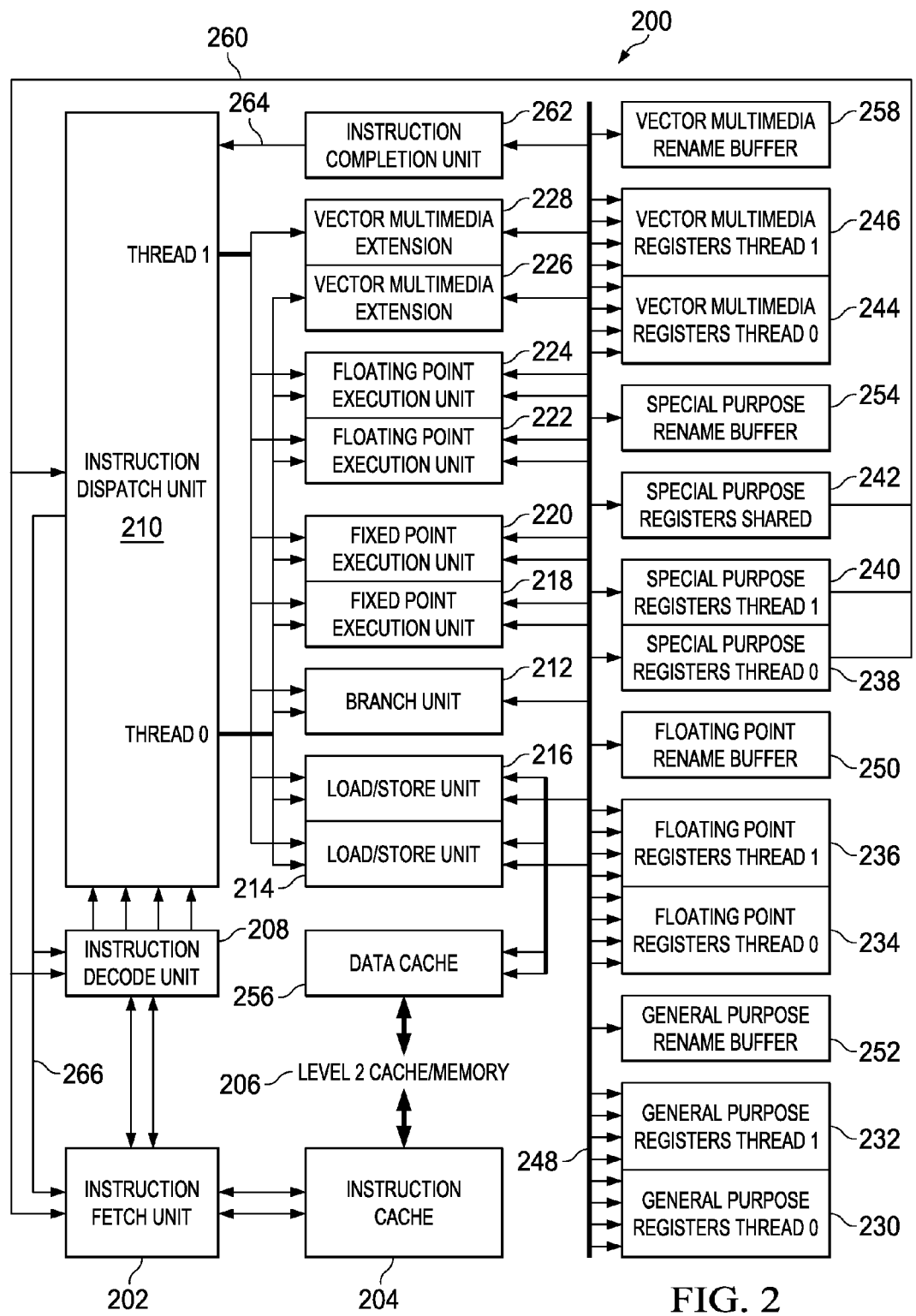
FIG. 2 is an example block diagram of a conventional dual threaded processor design showing functional units and registers is depicted in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a runtime dependence-aware scheduling mechanism that schedules and executes independent iterations ahead of time in parallel with other iterations, this is only an example and is not intended to state or imply any limitation with regard to the features of the present invention. To the contrary, the illustrative embodiments are intended to include distributed data processing environments and embodiments in which independent iterations are scheduled at runtime and executed ahead of time in parallel with other iterations.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts an exemplary diagram of a data processing environment in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of a data processing system is shown in which illustrative embodiments may be implemented. Data processing system 100 is an example of a computer in which computer usable code or instructions implementing the processes may be located for the illustrative embodiments.

In the depicted example, data processing system 100 employs a hub architecture including a north bridge and memory controller hub (MCH) 102 and a south bridge and input/output (I/O) controller hub (ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the MCH through an accelerated graphics port (AGP), for example.

In the depicted example, local area network (LAN) adapter 112 is coupled to south bridge and I/O controller hub 104 and audio adapter 116, keyboard and mouse adapter 120, modem 122, read only memory (ROM) 124, universal serial bus (USB) ports and other communications ports 132, and PCI/PCIe devices 134 are coupled to south bridge and I/O controller hub 104 through bus 138, and hard disk drive (HDD) 126 and CD-ROM drive 130 are coupled to south bridge and I/O controller hub 104 through bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100. Java and all Java-based trademarks are trademarks of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processing unit 106. The processes of the illustrative embodiments may be performed by processing unit 106 using computer implemented instructions, which may be located in a memory such as, for example, main memory 108, read only memory 124, or in one or more peripheral devices.

A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, or telephone device in addition to taking the form of a PDA.

Referring to FIG. 2, an exemplary block diagram of a conventional dual threaded processor design showing functional units and registers is depicted in which aspects of the illustrative embodiments may be implemented. Processor 200 may be implemented as processing unit 106 in FIG. 1 in these illustrative examples. Processor 200 comprises a single integrated circuit superscalar microprocessor with dual-thread simultaneous multi-threading (SMT). Accordingly, as discussed further herein below, processor 200 includes various units, registers, buffers, memories, and other sections, all of which are formed by integrated circuitry. In addition, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction dispatch unit (IDU) 210. IDU 210 selectively groups decoded instructions from instruction decode unit 208 for each thread, and outputs or issues a group of instructions for each thread to execution units 212, 214, 216, 218, 220, 222, 224, 226, and 228 of the processor.

In an illustrative embodiment, the execution units of the processor may include branch unit 212, load/store units (LSUA) 214 and (LSUB) 216, fixed-point execution units (FXUA) 218 and (FXUB) 220, floating-point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPR) 230 and 232, floating-point registers (FPR) 234 and 236, special purpose registers (SPR) 238 and 240 and vector registers (VR) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 248.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. During execution of an instruction, VMXA 226 and VMXB 228 output their destination register operand data to VRs 244 and 246 when the instruction has passed the point of flushing in the pipeline.

Data cache 256 may also have associated with it a non-cacheable unit (not shown) which accepts data from the processor and writes it directly to level 2 cache/memory 206, thus bypassing the coherency protocols required for storage to cache.

In response to the instructions input from instruction cache 204 and decoded by instruction decode unit 208, IDU 210 selectively dispatches the instructions to execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed-point mathematical operations on register source operands, such as addition, subtraction, ANDing, ORing and XORing. FPUA 222 and FPUB 224 execute floating-point mathematical operations on register source operands, such as floating-point multiplication and division. LSUA 214 and LSUB 216 execute load and store instructions, which move operand data between data cache 256 and ARFs 230, 232, 234, and 236. VMXA 226 and VMXB 228 execute single instruction operations that include multiple data. Branch unit 212 executes branch instructions, which conditionally alter the flow of execution through a program by modifying the instruction address used by IFU 202 to request instructions from instruction cache 204.

IDU 210 groups together instructions that are decoded by instruction decode unit 208 to be executed at the same time, depending on the mix of decoded instructions and available execution units 212, 214, 216, 218, 220, 222, 224, 226, and 228 to perform the required operation for each instruction. For example, because there are only two load/store units 214 and 216, a maximum of two load/store type instructions may be grouped together. In an illustrative embodiment, up to seven instructions may be grouped together (two fixed-point arithmetic, two load/store, two floating-point arithmetic (FPU) or two vector multimedia extension (VMX), and one branch), and up to five instructions may belong to the same thread. IDU 210 includes in the group as many instructions as possible from the higher priority thread, up to five, before including instructions from the lower priority thread. Thread priority is determined by the thread's priority value and the priority class of its process. The processing system uses the base priority level of all executable threads to determine which thread gets the next slice of processor time. Threads are scheduled in a round-robin fashion at each priority level, and only when there are no executable threads at a higher level does scheduling of threads at a lower level take place.

However, IDU 210 dispatches either FPU instructions 222 and 224 or VMX instructions 226 and 228 in the same group with FXU instructions 218 and 220. That is, IDU 210 does not dispatch FPU instructions 222 and 224 and VMX instructions 226 and 228 in the same group. Program states, such as an instruction pointer, stack pointer, or processor status word, stored in SPRs 238 and 240 indicate thread priority 260 to IDU 210.

Instruction completion unit 262 monitors internal bus structure 248 to determine when instructions executing in execution units 212, 214, 216, 218, 220, 222, 224, 226, and 228 are finished writing their operand results to rename buffers 250, 252, 254, or 258. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228 and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 262 monitors for the completion of instructions, and sends control information 264 to IDU 210 to notify IDU 210 that more groups of instructions can be dispatched to execution units 212, 214, 216, 218, 220, 222, 224, 226, and 228. IDU 210 sends dispatch signal 266, which serves as a throttle to bring more instructions down the pipeline to the dispatch unit, to IFU 202 and instruction decode unit 208 to indicate that it is ready to receive more decoded instructions.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device, which is configured with flash memory to provide non-volatile memory for storing operating system files and/or user-generated data, for example. Essentially, data processing system 100 may be any known or later developed data processing system without architectural limitation.

With the mechanism of the illustrative embodiments, the data processing system, such as data processing system 100 in FIG. 1, provides a speculative multi-threading (SMT) environment in which the processing unit(s) 106 may execute multiple threads concurrently in a speculative manner. The data processing system 100 utilizes a speculative versioning cache (SVC) that supports the speculative execution of multiple concurrent threads. The SVC may be provided, for example, in a portion of a shared L1 or L2 cache, may be distributed over a plurality of L1 or L2 caches associated with a plurality of different processing unit(s) 106, or may be provided as a separate cache structure accessible by the processing unit(s) 106 and their processing cores. The SVC may store multiple versions of a cache line in cases where multiple threads are concurrently accessing the same cache line. The versions of the cache lines may be differentiated in the SVC by way of version identifiers (VIDs) associated with the cache lines. Thus, for example, multiple cache lines may have the same address tag but have different VIDs to thereby identify the cache lines being different versions of the same cache line, or a plurality of cache line versions of the same cache line set.

The mechanisms of the illustrative embodiments gather raw version pressure data about the various versions of cache lines utilized in the SVC and generate statistical version pressure information from the raw version pressure data. The statistical version pressure information may be utilized by software control mechanisms to control the execution of the threads in the data processing system so as to control the version pressure with regard to the various threads. The raw version pressure data is preferably gathered by hardware mechanisms provided in association with the speculative versioning cache and the thread execution hardware of the various processors. The statistical version pressure information may be generated by hardware mechanisms or may be generated by software processes, such as provided as part of compiler, operating system, or the like, based on the raw version pressure data.

Figure 3:
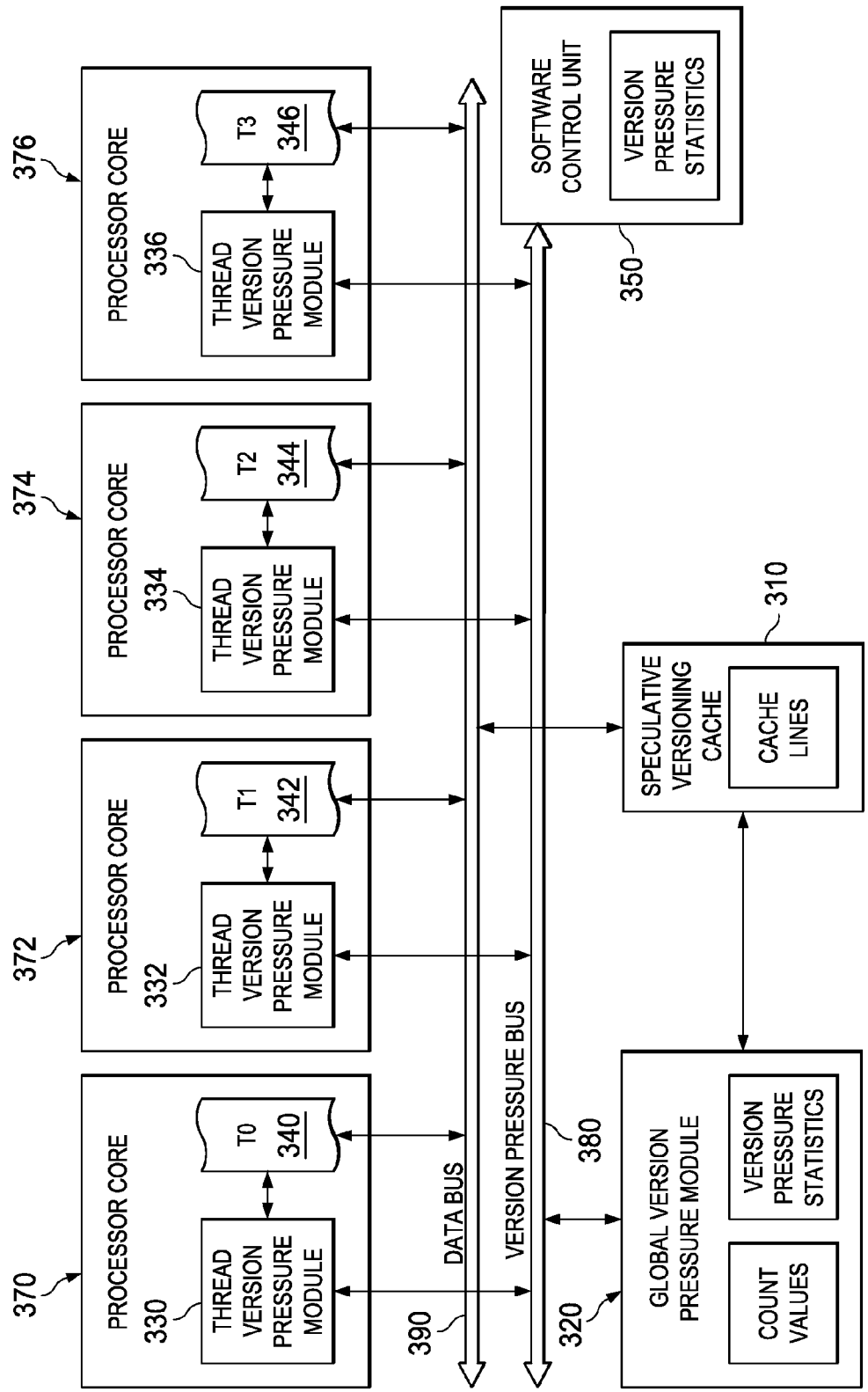
FIG. 3 is an example block diagram of the primary operational elements of one illustrative embodiment.

FIG. 3 is an example block diagram of the primary operational elements of one illustrative embodiment. As mentioned above, the version pressure module and speculative versioning cache mechanisms shown in FIG. 3 are preferably implemented in hardware while other elements, such as the software control unit 350, may be implemented as software executing on one or more processing devices.

Moreover, for simplicity, FIG. 3 will be described with regard to a single global version pressure module being provided in association with a single speculative versioning cache. However, it should be appreciated that the mechanisms of the illustrative embodiments may be distributed across a plurality of speculative versioning caches and a plurality of global version pressure modules in association with these speculative versioning caches. In still another illustrative embodiment, the single global version pressure module of FIG. 3 may be used in conjunction with a plurality of speculative versioning caches such that the single global version pressure module obtains raw version pressure data from these plurality of speculative versioning caches.

As shown in FIG. 3, the mechanisms of the illustrative embodiments include a speculative versioning cache 310 having an associated global version pressure module 320. The global version pressure module 320 maintains raw version pressure data and may comprise hardware and/or software that may generate version pressure statistic information based on this raw version pressure data. In addition, each of the processor cores 370-376 running a thread 340-346 has an associated thread version pressure module 330-336 for obtaining the raw version pressure data and/or the version pressure statistics information for its respective associated thread 340-346. A software control unit 350, which may be a compiler, an operating system, or the like, may be used in conjunction with the thread version pressure modules 330-336 and/or the global version pressure module 320 to determine an appropriate action to take to address version pressure issues within the speculative versioning cache 310 based on the raw version pressure data and/or the version pressure statistic information.

In the illustrative embodiment shown in FIG. 3, one thread 340-346 is associated with each core 370-376, respectively, and thread version pressure module 330-336. In other illustrative embodiments, there may be two or more threads associated with each core 370-376, in which case the two or more threads per core interact logically with one common shared thread version pressure module. In still other illustrative embodiments, the two or more threads per core each interact with their own private thread version pressure modules. Moreover, in other illustrative embodiments, the two or more threads may share a common thread version pressure module, but the common thread version pressure module may have some logic and state that is shared by all threads and other logic and state that is replicated so as to be private to each thread associated with the core.

In operation, typically when a conflict miss occurs, a cache handler determines a suitable candidate cache line to evict from the speculative versioning cache 310 taking into account any replacement policy that is being used by the speculative versioning cache 310, e.g., usage patterns (least recently used patterns), dirty bits (dirty cache lines require a write back to architected storage, clean cache lines do not), speculative state bits (speculative cache lines require thread squash), etc. In addition, with the mechanisms of the illustrative embodiments, when a conflict miss and replacement operation occurs, the global version pressure module 320 obtains a count of the number of versions of a cache line maintained in the speculative versioning cache 310 for the evicted cache line that is being replaced.

This count of the number of versions of an evicted cache line may be obtained in many different ways. For example, the count of the number of versions may be obtained by the global version pressure module 320 counting the number of cache line versions associated with the evicted cache line, such as by counting the number of bits on in an associativity range of the cache line. Alternatively, in some speculative versioning caches 310, pointers may be provided in cache lines pointing to a next version of the same cache line within the speculative versioning cache 310 and these pointers may be traversed with each new version of the cache line causing an increment in the count of the number of versions of the evicted cache line. Still further, a counter may be provided in the global version pressure module 320 in association with a set of cache lines when a cache line is loaded into the speculative versioning cache 310. This counter may be dynamically updated with each new version of the cache line generated in the speculative versioning cache 310 as threads attempt to modify the cache line.

The count obtained by the global version pressure module 320 may be used by the hardware of the global version pressure module 320, or a software control unit 350 executing on one or more processors of the data processing system, to generate version pressure statistic information for the set of cache lines associated with the counter. The version pressure statistic information may be generated for only the particular set of cache lines or may be aggregated with other version pressure statistic information for other sets of cache lines maintained by the speculative versioning cache 310. In one illustrative embodiment, the version pressure statistic information may be generated on a per cache line set basis such that the version pressure of a thread in association with a particular cache line set may be used to perform an action. In another illustrative embodiment, the version pressure statistic information may be generated on a per thread basis such that the version pressure of the thread in association with all of the cache line sets accessed by that thread may be used to perform an action. In still another illustrative embodiment, the version pressure statistic information may be generated on a per cache basis, such that the version pressure of the cache as a whole may be used as a basis for performing an action. Moreover, the version pressure statistic information may be aggregated over a plurality of speculative versioning caches such that the version pressure of the plurality of caches as a whole may be used as a basis for performing an action. In short, any individual or aggregate of the raw version pressure data may be used for generating version pressure statistic information and any individual or aggregate of the version pressure statistic information may be used to determine an appropriate action to address issues with regard to version pressure on one or more speculative versioning caches.

Either the raw version pressure data, the version pressure statistic information, or both are provided to the thread version pressure modules 330-336 in response to requests from the threads 340-346 for access to data of cache lines in the respective sets of cache lines in the speculative versioning cache 310. That is, when a thread, such as thread 340, sends a normal data request, e.g., a load/store request, to the speculative versioning cache 310, the data requested is returned to the thread 340 from the speculative versioning cache 310 and, along with this data, version pressure data/information is provided to the thread version pressure module 330, corresponding to the requesting thread 340, from the global version pressure module 320. The version pressure data/information provided in response to the request may be the version pressure data/information corresponding to the set of cache lines accessed by the request. As noted above, this data/information may further include version pressure statistics for the set of cache lines, the thread 340, the speculative versioning cache 310 as a whole, all of the speculative versioning caches in the data processing system, or the like. That is, the version pressure statistical information may be the aggregated statistical information that corresponds to the particular thread and/or set of cache lines. Alternatively, rather than sending version pressure statistic information, only the raw version pressure data may be transmitted to the thread version pressure modules with statistical information being generated by the thread version pressure modules, or a software control unit 350 working in conjunction with the thread version pressure modules, individually on the raw version pressure data they currently possess.

The propagation of the raw version pressure data/version pressure statistic information may require additional wires or additional data transfer cycles. However, it should be noted that the transfer of the raw version pressure data/version pressure statistic information is not critical to the operation of the system. Therefore, in one illustrative embodiment, the raw version pressure data/version pressure statistic information can be propagated from the global version pressure module 320 to the thread version pressure modules 330-336 via a slower, narrower bus, referred to in FIG. 3 as the version pressure bus 380, as opposed to the data bus 390. To assist in increasing the performance of the data processing system using a slower, narrower version pressure bus 380, in one illustrative embodiment, the raw version pressure data/version pressure statistic information may be pre-aggregated by the global version pressure module 320 before transmitting it across the version pressure bus 380, to thereby reduce communication bandwidth requirements.

In one illustrative embodiment, to further reduce the bus overhead, the version pressure bus 380 may be merged with another bus already present on the system, or may extend the functionality of another bus already present on the system. For example, the data processing environment 100 may have one or more performance monitoring busses that are used to monitor various performance counters, such as cache hit ratio counter(s), cache miss latency counter(s), branch hit ratio counter(s), and/or the like. The other bus may be present in the data processing environment 100 and may be suitable to be merged with the version pressure bus 380. In another illustrative embodiment, the version pressure bus 380 can be merged with the data bus 390, or with its related address bus.

In such an exemplary embodiment, the version pressure modules 320 and 330-336 can communicate when the data bus 380 or its related address bus are idle. Note also that FIG. 3 depicts the communication between caches 310 and cores 370-376 using buses. As will be appreciated by one of ordinary skill in the art in view of the present description, the illustrative embodiments are not limited to communication using buses and can be easily used with systems that utilize other communication structures, such as networks of dedicated links between any two pairs of communication agents (such as cores and caches), or any combinations of buses and dedicated links. The architecture shown in FIG. 3 is meant to only be an example of one illustrative embodiment and is not intended to be limiting with regard to the various implementations that may be made of the present invention or the illustrative embodiments described herein.

As mentioned above, the raw version pressure data may be used to generate version pressure statistic information that may then be used to determine appropriate actions for controlling the version pressure on the speculative versioning cache 310. Various types of version pressure statistic information may be generated by the mechanisms of the illustrative embodiments, e.g., in the global version pressure module 320, the individual thread version pressure modules 330-336, or a software control unit 350. This version pressure statistic information may be generated on a per thread basis, per cache basis, per data system basis, or the like.

For example, on a per thread basis, the generation of version pressure statistics may include obtaining the raw version pressure data, i.e. the count values for the various sets of cache lines touched by that particular thread, and then aggregating the raw version pressure data to generate one or more meaningful version pressure statistics. Such meaningful version pressure statistics include a maximum version pressure exerted by the thread on all of the sets of cache lines touched by the thread, average version pressure exerted by the thread across the various sets of cache lines touched by the thread, average version pressure exerted by the thread across the entire cache, maximum version pressure exerted by the thread on the entire cache, a total version pressure exerted by the thread on all of the sets of cache lines touched by the thread, or the like. That is, the version pressure exerted by a thread represents the particular threads' relative portion of number of versions of the cache lines in the particular set(s) of cache lines or cache as a whole. Thus, if a particular thread has a maximum raw version pressure count of 15 versions of a cache line in a set of cache lines, this maximum, relative to other threads accessing the same set of cache lines or the cache as a whole, may be quite large and represent a high version pressure exerted on the speculative versioning cache 310 by the particular thread.

As a further example, on a per cache basis, a similar aggregation of version pressure data may be used to generate meaningful version pressure statistics but with regard to all threads 340-346 and/or sets of cache lines in the speculative versioning cache 310. Thus, for example, the maximum and average values may be generated across all threads and all sets of cache lines in the speculative versioning cache 310, across all threads but for only a particular set of cache lines or sets of cache lines, or the like. The version pressure statistics may be gradually reduced, by recalculation of the version pressure statistic values, after each rollback or squashing of threads and may be gradually increased as higher version pressure statistic values are encountered.

The raw version pressure data, i.e. the count values for the various sets of cache lines, may be reset or reinitialized periodically or in response to detected events. For example, if a cache line is evicted, a thread is squashed, or the like, the corresponding raw version pressure data may be reset in the global version pressure module 320 and/or thread version pressure modules 330-336. In addition, the version pressure statistic information may likewise be reset or reinitialized periodically or in response to certain events such as those mentioned above. Moreover, the individual threads 340-346 may reset/reinitialize their own version of raw version pressure data/version pressure statistic information maintained in the thread version pressure modules 330-336 independently of the resetting/reinitializing of this data/information in other thread version pressure modules 330-336 or the global version pressure module 320.

It should be noted that the raw version pressure data and meaningful version pressure statistics may be provided in many different forms. For example, the data/information may be provided in terms of the absolute number of versions of the cache lines for the sets of cache lines in the speculative versioning cache 310. Alternatively, the data/information may be provided in terms of normalized values, e.g., a fraction of full capacity of the speculative versioning cache 310. Other formats of the raw data/statistic information may be used without departing from the spirit and scope of the illustrative embodiments.

Figure 4:
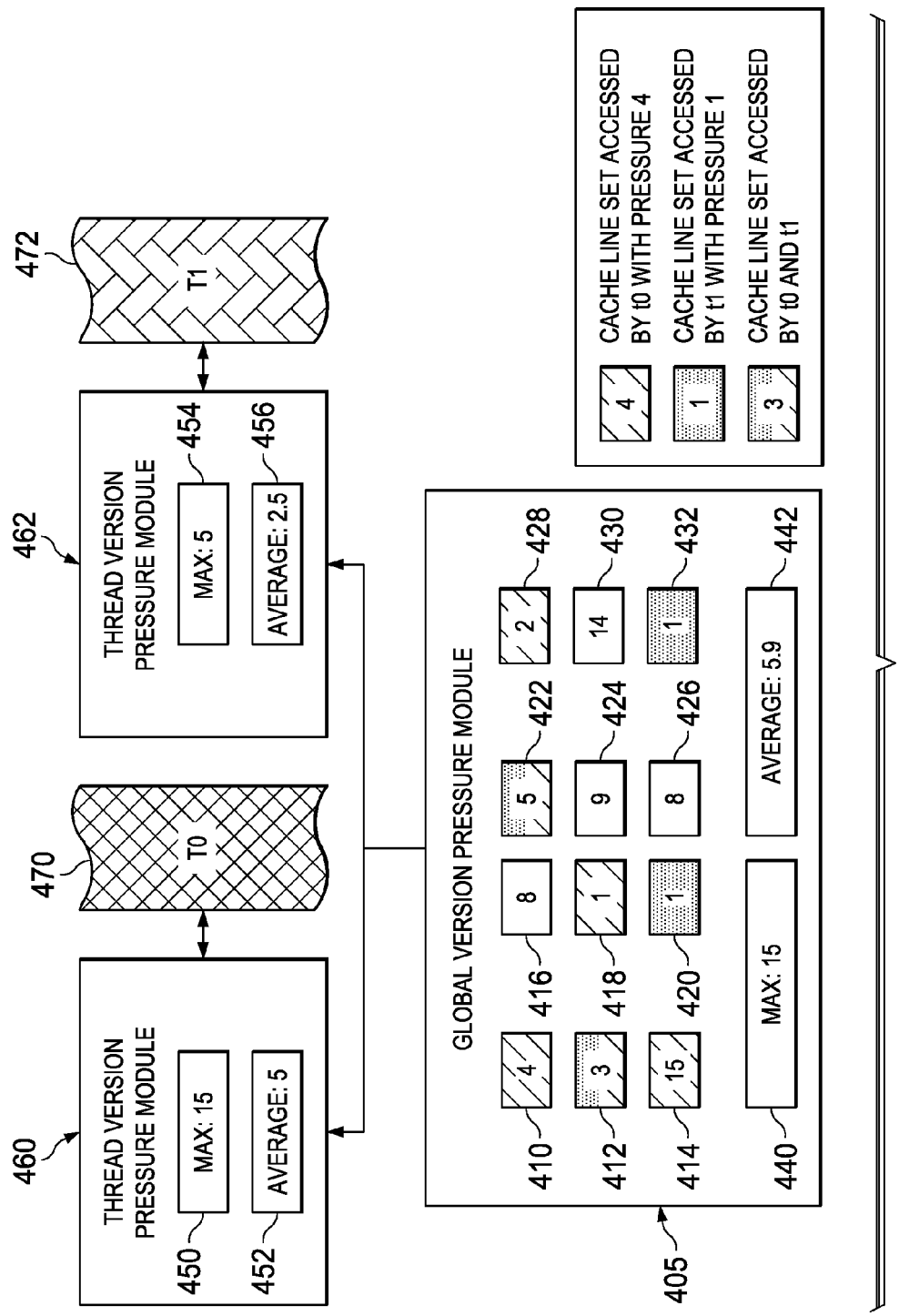
FIG. 4 is an example diagram illustrating the generation of meaningful version pressure statistics based on raw version pressure data in accordance with one illustrative embodiment.

FIG. 4 is an example diagram illustrating the generation of meaningful version pressure statistics based on raw version pressure data in accordance with one illustrative embodiment. As shown in FIG. 4, the global version pressure module 405 may generate counts 410-432 for various sets of cache lines of the speculative versioning cache. From this raw version pressure data 410-432, the global version pressure module 405 may generate version pressure statistic information 440-442 for the speculative versioning cache as a whole and, optionally, version pressure statistic information for individual threads 450-456. Moreover, in response to requests from threads 470-472, the global version pressure module 405 may provide the raw version pressure data 410-432 to the individual thread version pressure modules 460-462. In addition, or alternatively, the global version pressure module 405 may provide the version pressure statistic information 440-442 for the speculative versioning cache as a whole and/or the version pressure statistic information 450-452 to the individual thread version pressure modules 460-462 in response to requests, from the threads, for access to data in the speculative versioning cache.

For example, as shown in FIG. 4, thread 0 (labeled 470) is shown as having accessed or "touched" the cache line sets corresponding to count values 410, 412, 414, 418, 422, and 428. The total number of cache line versions in these sets of cache lines is 30 with a maximum number of cache line versions being 15 for the set of cache lines corresponding to the count value 414. The average number of cache line versions across all of the sets touched by thread 0 is 5.Similarly, as shown in FIG. 4, thread 1 (labeled 472) accessed or touched cache line sets corresponding to count values 412, 420, 422, and 432. The total number of cache line versions in these sets of cache lines is 10 with a maximum number of cache line versions being 5 for the set of cache lines corresponding to the count value 422. The average number of cache line versions across all of the sets touched by thread 1 is 2.5.

From these values, it can be determined thread 0 (labeled 470) exerts a high version pressure on the speculative version cache relative to thread 1 (labeled 472). Thus, an appropriate action, e.g., throttling of speculative execution, may need to be performed with regard to thread 0 so as to balance the version pressure exerted by thread 0 on the speculative versioning cache, as discussed in greater detail hereafter. Similarly, thread 1 exerts a relatively low version pressure on the speculative versioning cache and may increase speculative execution.

Moreover, as shown in FIG. 4, the maximum and average version pressure statistics may be generated for the speculative versioning cache as a whole. The total number of cache line versions in all of the sets of cache lines in the speculative versioning cache is 71 with a maximum number of cache line versions being 15 for the set of cache lines corresponding to the count value 414. The average number of cache line versions across all of the sets in the speculative versioning cache is 5.9 (71/12=5.9).

In one illustrative embodiment, these maximum and average values for the speculative versioning cache as a whole may serve as a basis for comparing the maximum and average version pressure statistics for the individual threads to determine whether a particular thread is exerting a relative high, average, or low version pressure on the speculative versioning cache. For example, for thread 0, since the maximum version pressure for the thread is the same as the maximum version pressure for the speculative versioning cache, and the average version pressure is close to the average for the speculative versioning cache as a whole, it may be deduced that thread 1 is exerting a relatively high version pressure on the speculative versioning cache. For thread 1, the maximum and average values are less than the maximum and average values for the speculative versioning cache as a whole and thus, may be considered to exert a relatively low version pressure on the speculative versioning cache. Various tolerance values may be established for determining whether maximum or average values are sufficient close or far away from the maximum and average values of the speculative versioning cache as a whole to determine whether a thread has high version pressure, average version pressure, or low version pressure.

As noted above, based on the version pressure statistic information gathered and/or generated by the global version pressure module and thread version pressure modules, a software control unit 350 in FIG. 3, may function to modify the operation of the data processing system with regard to the number of threads executing within the data processing system, the amount of work performed by the threads executing within the data processing system, the duration of transactions performed in a transaction memory system, or the like. The determination of when and how to modify the operation of the data processing system to balance version pressure amongst the threads may be performed by the software control unit 350, for example, during computations by corresponding threads, at various checkpoint times during the execution of a computer program, upon completion/failure of a thread's execution, or the like.

For example, with regard to modifying the operation of the data processing system to control the number of active threads, responsive to version pressure, the software control unit 350 may react by causing the data processing system to create additional threads to increase parallelism where version pressure is relatively low, and destroy existing threads to decrease version pressure and parallelism where the version pressure is determined to be relatively high. With regard to controlling the amount of work performed by threads, responsive to version pressure, the software control unit 350 may react by assigning large units of work to existing threads to increase effective parallelism where version pressure is relatively low, and assign smaller units of work to existing threads, or cause threads to be idle, to decrease version pressure and parallelism where version pressures is relatively high. With regard to controlling the duration of transactions, responsive to version pressure, the software control unit 350 may react by aggregating multiple units of speculations to lower transaction memory start/commit overheads where version pressure is determined to be relatively low, and disaggregate multiple units of speculation to lower version pressure where version pressure is determined to be relatively high.

FIG. 5 is an example portion of code illustrating a thread throttling action for addressing version pressure in accordance with one illustrative embodiment. With the thread throttling action, if the thread spawning conditions, other profitability metrics, and the version pressure is less than a predetermined threshold, then an additional speculative thread is spawned to perform work. Essentially, this action generates more speculative threads when the version pressure is below the threshold and other conditions and metrics indicate that the spawning of the speculative thread may be performed. However, if the threshold is met or exceeded, no additional speculative threads are spawned.

The particular threshold against which version pressure is measured may vary dynamically. For example, the threshold may vary as a function of the number of speculative threads currently active in the data processing system. For example, in one illustrative embodiment, the non-speculative thread may spawn a speculative thread if the version pressure is smaller than a static predetermined threshold, e.g., 50%, i.e. the non-speculative thread exerts less than 50% of the version pressure on the speculative versioning cache. In another illustrative embodiment, a first speculative thread may be spawned when the version pressure is less than 30% and a second speculative thread may be spawned when the version pressure is less than 20%, and so on. Thus, the threshold becomes more stringent as the number of speculative threads executing increases.

On a per-thread version pressure basis, it would be beneficial for the non-speculative thread to perform some work to gather meaningful version pressure data prior to determining whether to spawn an additional speculative thread or not. On a global version pressure basis, i.e. using the version pressure information for the speculative versioning cache as a whole, the global version pressure statistics information may be reset when a predetermined number of threads complete execution.

Upon determining that the version pressure is too high, the software control unit 350 may squash speculative threads in order to reduce version pressure on the speculative versioning cache. The particular speculative threads that may be squashed may be determined based on how far they are away from the non-speculative thread that spawned them. For example, if a non-speculative thread spawns two additional speculative threads, the second speculative thread may be squashed first, followed by the first speculative thread. Alternatively, the speculative threads to squash may be prioritized based on the speculative threads exerting the most version pressure on the speculative versioning cache. That is, those speculative threads exerting the most version pressure on the speculative versioning cache may be squashed first followed by a next speculative thread exerting a next highest version pressure on the speculative versioning cache, and so on. In still another illustrative embodiment, a combination of these approaches may be used wherein the speculative threads that are furthest away from the non-speculative thread and exert the highest version pressure may be selected for squashing first.

FIG. 6 is an example portion of code illustrating a workload throttling action for addressing version pressure in accordance with one illustrative embodiment. As shown in FIG. 6, depending on the version pressure, the amount of speculating work being done by a speculative thread is increased or decreased. With high version pressure, a smaller amount of work being performed by a speculative thread reduces the granularity of speculation and thus, reduces the amount of cache lines generally accessed or touched by the speculating threads. The amount of work given to a speculative thread may vary dynamically, such as a function of the number of speculative threads active in the data processing system. It should be noted that the functionality of the code outlined in FIG. 6 may be combined with the functionality of the code in FIG. 5 in some illustrative embodiments.

Again, on a per-thread version pressure basis, it would be beneficial for the non-speculative thread to perform some work to gather meaningful version pressure data prior to determining whether to spawn an additional speculative thread or not. On a global version pressure basis, i.e. using the version pressure information for the speculative versioning cache as a whole, the global version pressure statistics information may be reset when a predetermined number of threads complete execution.

FIG. 7 is an example portion of code illustrating an idling thread action for addressing version pressure in accordance with one illustrative embodiment. Initially, a fixed number of threads are initially created and each take work in turn. While the initial number of threads may be modulated as a function of the expected version pressure, here the scheme is to dynamically adapt the effective number of speculating threads by placing some threads in an idle state. Specifically, the "wait" in the depicted code pauses the current thread if the pressure threshold is above a given amount. In another illustrative embodiment, the "wait" in the depicted code pauses the current thread until the version pressure drops below the given threshold. The wait state can further be exited in response to a given amount of time lapsing, or other events not specifically shown in FIG. 7. The amount of time that the thread is idle can be a predetermined amount of time, or a varying amount of time, depending on various factors, including the version pressure. It should be noted that the functionality of the code outlined in FIG. 7 may be combined with the functionality of the code in FIGS. 5 and/or 6 in some illustrative embodiments.

FIG. 8 is an example diagram illustrating a transaction aggregation action for addressing version pressure in accordance with one illustrative embodiment. As shown in FIG. 8, traditionally a transaction is committed immediately after the work associated with transaction is completed. However, with the mechanisms of the illustrative embodiments, the work of transactions may be conditionally aggregated until the version pressure on the speculative versioning cache meets or exceeds a threshold.

In other words, code is initially generated with the smallest possible critical region protected by a transaction. However, the point at which this critical region is closed is determined dynamically. That is, critical regions of transactions may be combined into a single transaction until it is determined that the version pressure is too high. Once the version pressure is too high, the transaction may be closed and the transaction committed. Of course other metrics may be taken into account when determining when to close a transaction. For example, a maximum number of transactions to aggregate may be set and a transaction may be closed either when the version pressure gets too high or the number of transactions aggregated reaches this maximum number. Further, a degree of parallelism may be taken into account, e.g., a number of concurrent threads executing on the same data, when determining when to close a transaction. The number of concurrent threads is typically known by the "master" thread, i.e. the thread that initiated all of the other "worker" threads (that is, the worker threads are the ones performing the work, including the non-guarded work as well as the guarded work, as depicted in FIG. 8). The number of concurrent threads can be set by the master thread in a global variable that can be read by the worker threads and used in conjunction with the version pressure information in order to assist them to determining when to dynamically close transactions.

The particular transactions to aggregate together may be selected in a number of different ways. For example, tasks or transactions that result in high version pressure and tasks/transactions that result in low version pressure may be aggregated together in the same transaction so as to average their version pressures. Alternatively, several low version pressure tasks/transactions may be aggregated together. Still further, a determination may be made dynamically before closing a transaction as to whether the aggregation of a next transaction will put the expected version pressure of the transaction above a maximum threshold and if not, the next transaction may be aggregated with the current transaction. If the next transaction would cause the expected version pressure to exceed the maximum threshold, the transaction may be closed without aggregating the next transaction.

The modifications of the operation of the data processing system performed by the software control unit may be effected in a number of different ways. Primarily, the code of a computer program is transformed by the software control unit so as to respond to the version pressure in the various ways discussed above, e.g., by increasing/decreasing the number of speculative threads, increase/decreasing the amount of speculative work performed by the threads, aggregating/not aggregating transactions, and the like. Of course, other types of modifications to the operation of the data processing system based on the determined version pressure statistics may be used by the mechanisms of the illustrative embodiments without departing from the spirit and scope of the illustrative embodiments.

Figure 9:
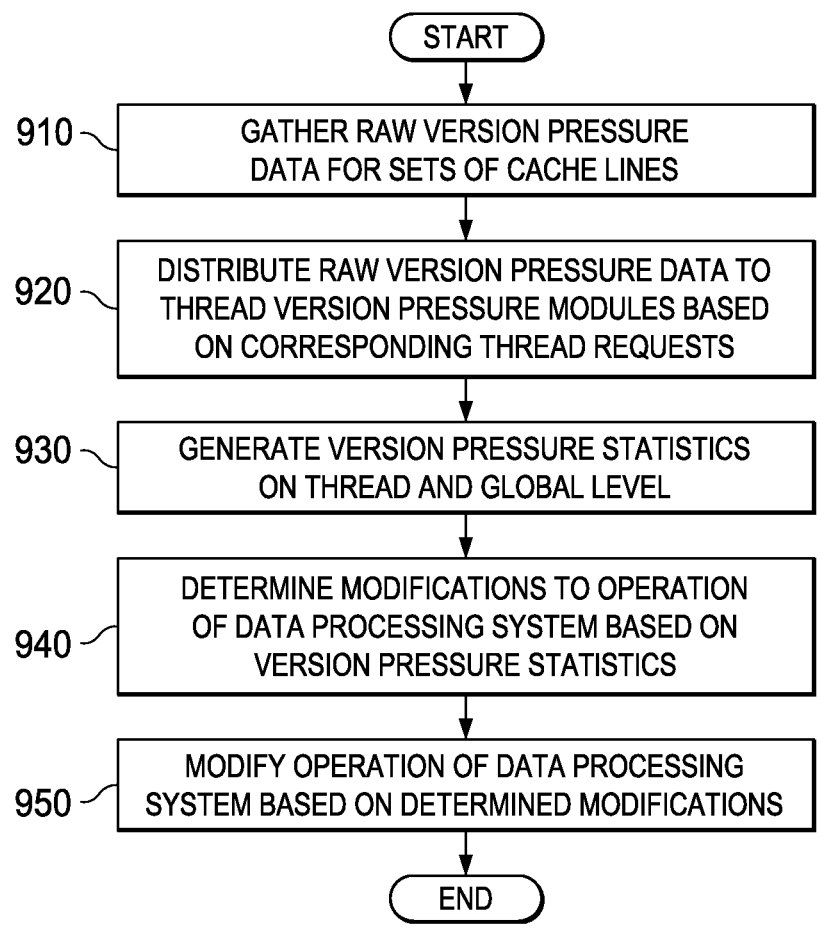
FIG. 9 is a flowchart outlining an example operation for using version pressure feedback to adjust the operation of a data processing system in accordance with one illustrative embodiment.

FIG. 9 is a flowchart outlining an example operation for using version pressure feedback to adjust the operation of a data processing system in accordance with one illustrative embodiment. As shown in FIG. 9, the operation starts with gathering raw version pressure data for sets of cache lines in a speculative versioning cache (step 910). The raw version pressure data is distributed to thread version pressure modules based on their corresponding thread requests (step 920). As discussed above, this raw version pressure data may be obtained using counters associated with cache lines of the speculative versioning cache, for example.

Version pressure statistics are generated on both a thread and global level (step 930). Based on the version pressure statistics, modifications to be performed on the operation of the data processing system are determined to balance/reduce the version pressure on the speculative versioning cache (step 940). As noted above, these version pressure statistics may be any statistical measure of version pressure generated based on the raw version pressure data. For example, these version pressure statistics may be the maximum and average version pressure for particular threads, the speculative versioning cache as a whole, or the like. In a preferred illustrative embodiment, both global and thread-specific version pressure statistics are generated. However, to reduce hardware cost, or for other reasons, some illustrative embodiments may only implement version pressure statistics for the entire cache system, for specific caches in the cache hierarchy, for multiple threads co-residing in a core, for each individual threads, or the like.

The operation of the data processing system is then modified based on the determined modifications to be performed (step 950). The operation then ends. As discussed above, these modifications may involve transforming code by throttling the number of speculative threads, squashing speculative threads, throttling an amount of work executed by speculative threads, making existing threads enter an idle state, aggregating transactions, or the like. This operation may be repeated on a continual basis, periodic basis, or in response to the occurrence of predetermined events.

Thus, the illustrative embodiments provide mechanisms for monitoring the version pressure exerted by threads on a speculative versioning cache and using this version pressure information to effect changes in the operation of a data processing system to reduce the version pressure on the speculative versioning cache and/or balance the version pressure exerted by the threads. The illustrative embodiments gather raw version pressure information, generate statistical measures of the version pressure, and use the statistical measures to determine what types of modifications to apply to the execution of code in the data processing system. In this way, the version pressure exerted on the speculative versioning cache may be controlled so as to minimize the costs of squashing speculative threads in the data processing system due to excessive version pressure on the speculative versioning cache.

In addition to the above, as mentioned previously, the illustrative embodiments further provide mechanisms for using the version pressure monitoring mechanisms described above to control checkpointing operations using the speculative versioning cache (SVC). With the mechanisms of these additional illustrative embodiments, the SVC may be apportioned such that one portion of the SVC stores non-speculative cache lines for read/load operations while another portion of the SVC stores speculative cache lines associated with write/store operations. Thus, in these additional illustrative embodiments, all reads are treated as non-speculative operations while all write operations are treated as speculative operations. The portion of the SVC allocated for storing speculative cache lines corresponding to write/store operations may have a maximum size, e.g., 20% of the SVC capacity. One or more thresholds may be generated based on this maximum size of the SVC capacity, or the maximum size itself may be used as the threshold. When these one or more thresholds are reached, a checkpoint of the current non-speculative state of the executing code, with regard to the cache lines in the non-speculative portion of the SVC, may be generated.

One or more checkpoints may be generated in response to the occurrence of a condition, such as meeting or exceeding the one or more thresholds, resulting in the need to generate the one or more checkpoints. A checkpoint itself may be stored as a speculative cache line which may later be made non-speculative should a condition occur that requires a rollback of changes made to the cache lines. For example, such conditions may include the execution of the code causing an entry into a non-replayable portion of code, i.e. a portion of code that cannot be replayed should changes be rolled back to a point in time prior to that non-replayable portion of code executing, or a condition of the version pressure of the SVC meeting a predetermined criteria, such as the one or more thresholds mentioned above. It is also possible to rollback to an existing checkpoint should a condition occur that requires a rollback. For example, such a condition may include the detection of a soft error in cached data, e.g., an error occurring due to gamma radiation or other physical phenomena that may cause the flipping of one or more bits in one or more cache lines. Each of these conditions will be described in greater detail hereafter.

The version pressure modules of the illustrative embodiments are provided with logic for monitoring for such conditions and to generate interrupts should such a condition. The version pressure modules may generate such an interrupt which is received in the operating system. The operating system may initiate an appropriate interrupt handler for promoting speculative cache lines to a non-speculative state and initiating the creation of new checkpoint cache lines. Moreover, compiler support may be provided for determining if the execution of code is entering a non-replayable portion of code and, if so, causing speculative cache lines to be promoted to a non-speculative state and initiating new speculative checkpoint cache lines after execution of the non-replayable portion of code has completed. That is, the compiler may insert instructions for calling an appropriate interrupt handler, a routine, method, or the like to perform such promotion and later initialization of new speculative checkpoint cache lines. The operating system is further provided with logic for determining whether interrupts, which may have various sources, are due to the checkpoint mechanisms of the illustrative embodiments, in which case the promotion of speculative cache lines and initiating of new speculative checkpoint cache lines is implemented. Multiple versions of checkpoint cache lines may be stored in some illustrative embodiments and the interrupt handler, operating system, or the like, may determine the most appropriate version of the checkpoint cache line to use when a rollback operation is required.

Figure 10:
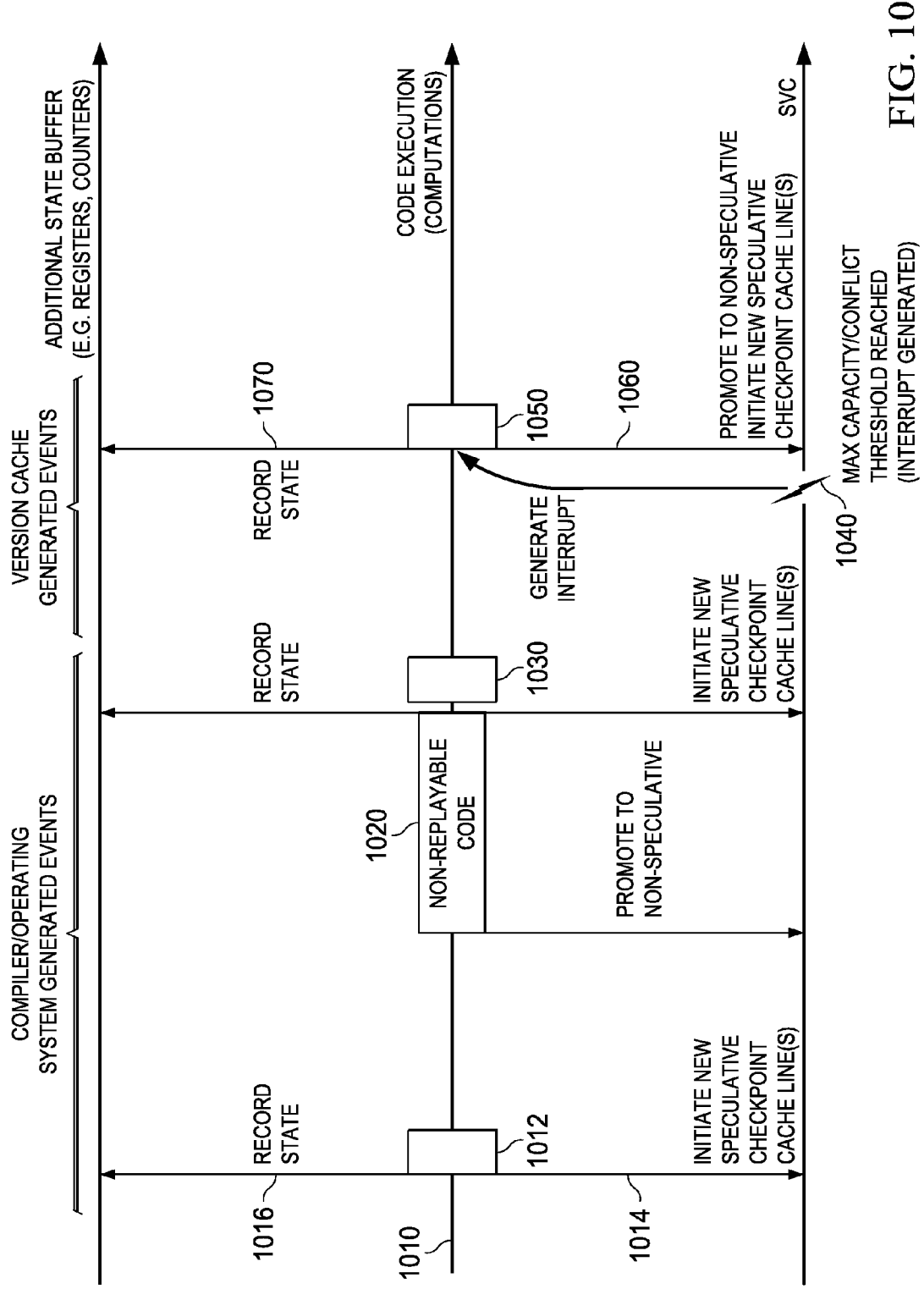
FIG. 10 is an example diagram illustrating the operation of the speculative versioning cache checkpoint mechanisms in accordance with one illustrative embodiment.

FIG. 10 is an example diagram illustrating the operation of the speculative versioning cache checkpoint mechanisms in accordance with one illustrative embodiment. An operating system of the data processing system associated with the speculative versioning cache (SVC) sets one or more threshold values indicative of a maximum number of cache lines in the SVC that may be used for storing speculative cache lines due to write/store operations being performed by executing code. Again, with these additional illustrative embodiments, all read/load operations are considered to be non-speculative operations while all write/store operations are considered to be speculative in nature until their changes are persisted to a non-speculative state in accordance with the mechanism of the illustrative embodiments described herein. The read/load operations are non-speculative in that they are not changing the state of the cache, and thus do not need to generate a new version of a cache line. However, if a read/load operation follows a speculative write operation that resulted in a new version and associated versioned cache line, then the read/load operation will read the result of the write operation; namely the read operation will read the new version of the cache line instead of the old value. This is the case as the older values are only preserved so as to restore the state of the cache in case of a soft-error or any other conditions that forces the system to rollback to a previous state. The one or more threshold values may be associated with the SVC as a whole, individual cache line sets, individual threads, any combination of these, or the like. The thresholds may be used to determine when to convert speculative cache lines to a non-speculative state and perform a new checkpoint operation, for example. As an example, the one or more thresholds values may be a first threshold of 10% of the overall SVC capacity being populated with speculative cache lines due to speculative writes/stores or up to 50% of a given set of cache lines in the SVC being populated with speculative cache lines due to speculative writes/stores. If either of these conditions exist, an interrupt may be triggered for promoting speculative cache lines and generating a new checkpoint. Alternatively, a single threshold may be used, e.g., 20% of the SVC capacity being populated with speculative cache lines.

These thresholds are basically measures of version pressure within the SVC which may be generated using the version pressure modules previously described above. The major difference being that the version pressure modules are now provided with the logic and capability to generate interrupts to the operating system so as to cause an appropriate interrupt handler to be executed for promoting speculative cache lines to a non-speculative state and initiating a new checkpoint. These interrupts are delivered from the global version pressure module 320, or from the thread version pressure modules 330-336, to the threads 340-346 so as to interrupt the thread's regular execution in order to execute code associated with the specific interrupt routine that is associated with the interrupt signal or code assigned to the version pressure being too high in the SVC. When delivering an interrupt from the global version pressure module 320 to at least one thread 340-346, the interrupt may be delivered via the version pressure bus 380 or via a separate interrupt bus.

As shown in FIG. 10, as code is executing 1010, a checkpoint 1012 may be initiated. The initiation of this checkpoint 1012 may be due to the checkpoint 1012 being the initial checkpoint 1012 during the execution 1010 of the code or the occurrence of a detected condition being present, as discussed hereafter. As part of generating the checkpoint 1012, a new version identifier (VID) is generated, and is associated with the current thread. This new VID, e.g., VID X, is then used to tag all store operations to the cache. In subsequent stores, the VID associated with the thread is retrieved and is used when accessing the cache. If there is a hit in the cache, i.e. the data is in a cache line of the speculative versioning cache, a check is made as to whether this cache line that is "hit" by the write/store operation is also associated with the current VID X. If it is, then the write/store can proceed as normal. If the currently "hit" cache line is associated with an older VID, or is not associated with a VID but is non-speculative, then the cache needs to copy this cache line. This new copy is labeled as speculative and is associated with VID X. The store is then able to proceed on this copied cache line as usual. Thus, for a checkpoint in the SVC, there is one additional speculative cache line, associated with a new VID, for each cache line in which there was a store since the last checkpoint. Other state information that is not stored in the non-speculative cache, such as the state of program counters, system registers, and the like, may be recorded 1016 in one or more buffers of the data processing system. The information in the checkpoint speculative cache lines as well as the state information stored in the one or more buffers may be utilized at a later time should a rollback of the execution of the code be necessary, such as due to a failure in the execution of the code, a soft error, or the like. The initiation of the checkpoint 1012 may be performed by the code itself, the operating system, a compiler, or the like.

Following the generating of the checkpoint 1012, the code continues to execute with the code performing reads/loads and writes/stores according to the particular code being executed. As mentioned above, reads/loads are treated as non-speculative operations and thus, any cache lines generated in the SVC due to these reads/loads are stored in a non-speculative portion of the SVC. All writes/stores performed by the execution of the code are considered to be speculative and thus, cache line changes occurring as a result of these writes/stores are stored in speculative cache line versions within the speculative portion of the SVC. Thus, the number of speculative cache lines in the speculative portion of the SVC may increase as the code is executed thereby increasing the version pressure within the SVC. Note that there may not be a physical portion of the SVC that is reserved for the speculative portion or the non-speculative portion. Just after a checkpoint, before any stores, typically 100% of the SVC will contain non-speculative data. As stores are encountered, new versions of cache lines (if an original version was already present), or simply speculative cache lines (if an original version was not already present at the time of the write access) are created. Such version/speculative cache lines are speculative in nature due to the fact that changes to these cache lines may have to be rolled back should a condition occur requiring changes to be invalidated.

At a later point in time while the code is executing, a portion of code that is non-replayable 1020 may be encountered and executed. Non-replayable code 1020 may be code that performs an operation, such as an input/output operation, file operations such as reading or writing to a file, messaging operations such as sending and receiving messages over the network, code that shares data with another thread, accessing of locks, or the like, which cannot be replayed should the state of the executing code be rolled back to a checkpoint occurring prior to the execution of the non-replayable code 1020. That is, when the state of an executing code is rolled back to a checkpoint, the state of the executing code is reset to the state stored at the checkpoint and then code that was executed may be replayed from this checkpointed state. Non-replayable code 1020 is code that affects the operation of other threads or otherwise provides data to other code executing external to the present executing thread.

The compiler may insert instructions into the executable code in association with the non-replayable code 1020 to cause the execution of the code to initiate an interrupt to an interrupt handler which promotes speculative cache lines to a non-speculative state, or otherwise the instructions themselves may promote speculative cache lines to a non-speculative state, prior to entry into the non-replayable code 1020. Thus, all speculative cache lines associated with the executing code and with a specific thread are promoted to non-speculative states, i.e. the changes represented in the speculative cache lines are persisted to the non-speculative portion of the SVC and/or memory, and the non-replayable code 1020 executes with its changes to the SVC being performed non-speculatively. Once the non-replayable code 1020 completes execution, compiler inserted instructions generate an interrupt to the operating system which calls an interrupt handler for initiating a new checkpoint 1030. Alternatively, the compiler may insert instructions that directly initiate a new checkpoint 1030.

It should be noted that while the above assumes that the compiler analyzes the code and inserts instructions into the executable code for performing the operations of generating an interrupt or otherwise promoting the speculative cache lines to a non-speculative state, the illustrative embodiments are not limited to such. Rather, the operating system may analyze operations being performed by the executing code, determine whether those operations are indicative of a non-replayable portion of code, and if so, initiate the interrupt or execution of code to cause the speculative cache lines to be converted to a non-speculative state and initiating a new checkpoint following the performance of the non-replayable portion of code's operations. For example, the compiler or operating system may identify code/operations that are associated with writing to an I/O device, passing information between threads, or the like, and may either insert instructions into the code (compiler) or initiate an operation (operating system) to cause the transition of speculative cache lines to non-speculative cache lines, to execute code associated with entering a non-replayable code section and/or generation of a new checkpoint.

In generating the new checkpoint 1030, as mentioned above, a new version identifier (VID) is generated, and is associated with the current thread. This new VID, e.g., VID X, is used to tag all store operations to the cache. In subsequent stores, the VID associated with the thread is retrieved, and is used when accessing the cache. If there is a hit in the cache, a check is performed as to whether the cache line is also associated with the current VID X. If it is, then the store can proceed as normal. If the current cache line is associated with an older VID, or is not associated with a VID but is non-speculative, then the cache copies this cache line and labels the copy of the cache line as speculative and associated with VID X. The store is then able to proceed on this copied cache line as usual. State information that is not present in the SVC, e.g., program registers, system registers, program counters, etc., is recorded in one or more buffers as checkpoint information.

The execution of the code continues with read/load operations causing updates to a non-speculative portion of the SVC and writes/stores causing an increase in the number of speculative cache lines in the speculative portion of the SVC. As the number of speculative cache lines in the SVC increases, the version pressure increases in a manner similar to that previously described above. This version pressure may be with regard to the SVC as a whole, a set of associated cache lines, a particular thread, or the like. Zero or more thresholds may be established for such version pressure at one or more of these levels, e.g., zero or more thresholds at the SVC as a whole level, zero or more thresholds at the set of associated cache lines level, zero or more thresholds at the thread level, and the like. Preferably, at least one threshold is established at one of these levels.

At a later point in time, the version pressure of the SVC with regard to the speculative cache lines may exceed one or more thresholds, e.g., a maximum capacity threshold, a version pressure threshold for the SVC as a whole, a combination of a version pressure threshold at the SVC level, thread level, and/or cache line set level, or the like. If the one or more thresholds are met or exceeded, a corresponding version pressure module generates an interrupt 1040 to the operating system which again calls an interrupt handler to handle the promotion of speculative cache lines to non-speculative state and the creation of a new checkpoint. The version pressure module that generates the interrupt may be a global version pressure module or a thread version pressure module. In a system where checkpointing is done on a per-thread basis, it is generally more beneficial to associate a version pressure threshold in the thread version pressure module, as in such a system the thread is the "unit of checkpointing." One may also consider associating a per cache or per system version pressure threshold which would result in generating an interrupt to each of the threads in the system (in turn, or simultaneously). In such a system, checkpointing is still performed on a per-thread basis but the checkpointing can be triggered by a global condition, such as a version cache having too many cache lines dedicated to checkpointing. In a system where checkpointing is done on a per system basis, all the threads generate a checkpoint at substantially the same time, as they are using a single shared checkpoint for all threads in the system. In such a system it is generally more beneficial to use a single threshold for the entire SVC.

In response to the interrupt, the operating system calls an interrupt handler that performs operations to promote the speculative cache lines stored in the speculative portion of the SVC to a non-speculative state. This promotion is simply performed by labeling the VID associated with the thread as non-speculative. This promotion may also force some of the prior non-speculative lines to become invalid. For example, assume that there is a cache line that exists under two versions: a speculative version under VID X and a non-speculative version. When VID X is promoted to non-speculative, the cache line associated with VID X becomes the new non-speculative state. As a result, the old non-speculative line, which was kept for the purpose of rolling back to the older state at the time of the previous checkpoint, is now invalid, as the version of the cache line with VID X is now the new non-speculative version. Thus, only non-speculative cache lines for which there is also a version under VID X are invalid in the process of the promotion of VID X to a non-speculative state.

Once the speculative cache lines are promoted to a non-speculative state, the interrupt handler initiates the creation of a new checkpoint 1050. The creation of the new checkpoint 1050 may include storing the non-speculative state of the non-speculative cache lines as one or more checkpoint cache lines in the speculative portion of the SVC 1060. Furthermore, state information that is not stored in the SVC, e.g., program counter, system registers, and other state information, may be maintained in one or more buffers 1070.

It should be appreciated that, between checkpoints, it may be the case that a failure of the executing code, a soft error, or the like may be detected. For example, error correction code (ECC), parity data, and the like, may be used to identify errors in the data stored in cache lines of the SVC. Such errors, for example, may be soft errors which are caused by gamma rays or the like, which cause bits within the cache lines to flip states and thereby introduce errors into the stored data. Such soft errors may be detected by ECC, parity data, or the like. The processor, the processor memories, the system memories, operating system, version pressure modules, or the like, may have associated logic for performing such detection and for generating an interrupt in the event that such an error is detected. There may be additional logic in the processor, the memories, the operating system, version pressure modules, and the like that enable the processor, the memory controller, the operating system, the version pressure modules, or the like to correct the error. In such a case, when the error can be corrected, there is no need to generate an interrupt so as to roll back to the prior checkpoint.

The interrupt may be received in the operating system which calls an appropriate interrupt handler for performing one or more operations to roll-back any changes made to the non-speculative cache lines between checkpoints. That is, a suitable checkpoint occurring prior to the detected error is selected and the corresponding state information in the checkpoint cache line(s) is used to restore the state of the non-speculative cache lines to the state of the checkpoint. Thereafter, events may be replayed, the execution of the code restarted, or the like, so that the error is corrected.

Figure 11:
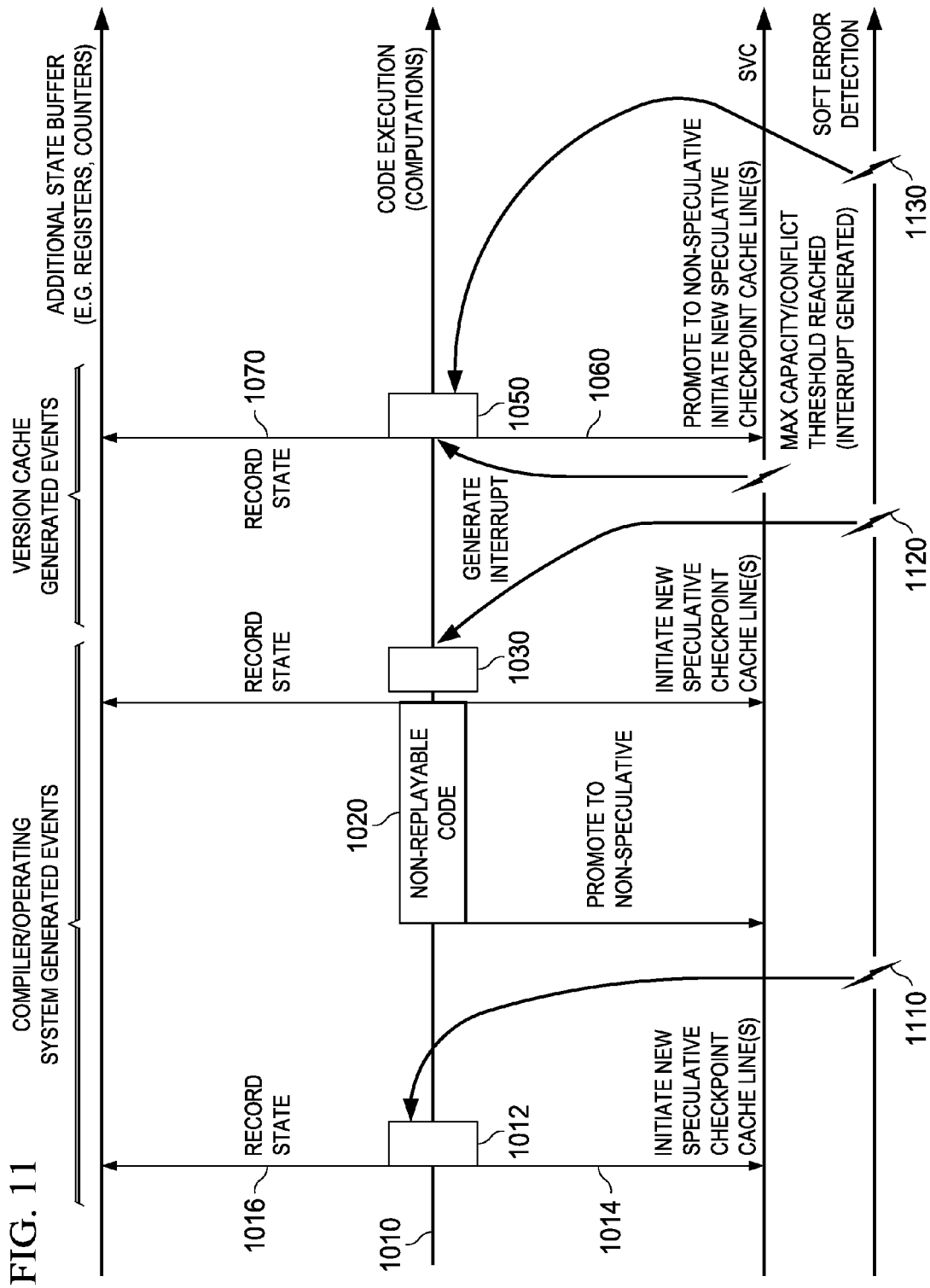
FIG. 11 is an example diagram illustrating the speculative version cache checkpointing mechanism with regard to the occurrence of soft errors in accordance with one illustrative embodiment.

FIG. 11 is an example diagram illustrating the speculative version cache checkpointing mechanism with regard to the occurrence of soft errors in accordance with one illustrative embodiment. FIG. 11 is essentially the same as FIG. 10 with the exception that soft errors 1110, 1120, and 1130 are illustrated as being detected in the speculative version cache (SVC). These soft errors, as noted above, may be due to gamma rays causing bits to flip or other software related errors. In response to such errors, the processor, the memory controller, the version pressure module (either global or thread), or the like may generate an interrupt to the operating system which determines whether the interrupt occurred during execution of a portion of code that is checkpointed, i.e. that the code that was executing is not non-replayable code. If an error occurred during a non-replayable code section, then a non-recoverable error has been encountered. In such an event, the application may be notified that an irrecoverable error has occurred, generally under the form of an irrecoverable error interrupt. This may lead to termination of the application based on the error. It may also lead the application to recover to a user-level checkpoint. For example, some simulation applications store results obtained every 100 (or any other static or dynamic number) time steps to hard disk so as to enable the user to later visualize the results of the simulation. In such a system, the application typically has a "user level" checkpointing in that one can then restart the overall simulation at the previously encountered 0 mod 100 time steps. Such user level checkpointing can be used in conjunction with the illustrative embodiments to provide recovery to the user level checkpoint in response to an irrecoverable error from a non-replayable portion of code.

If the interrupt occurred while checkpointed code was executing, then the execution of the code can be rolled-back to a state of a previous checkpoint. For example, the soft error 1110 may cause an interrupt to the operating system which determines that the error occurred in checkpointed code, since the error did not occur in the non-replayable code portion 1020. Accordingly, the operating system, or an interrupt handler associated with the operating system, performs operations to roll-back changes to the state of the executing code and the SVC to the checkpoint 1010. That is, the state stored in the one or more buffers and the state of the cache lines stored in the checkpoint cache lines of the SVC are used to restore the state of the corresponding program counter, system registers, and the like, and the SVC's non-speculative cache lines. Thus, the state of the executing code is returned to the state at the time of the previous checkpoint. Similarly, soft error 1120 may cause an interrupt that results in the state of the code execution being returned to the state at the time of the checkpoint 1030 and soft error 1130 may cause an interrupt that results in the state of the code execution being returned to the state at the time of the checkpoint 1040.

Thus, the illustrative embodiments provide mechanisms for setting thresholds with regard to the version pressure in the SVC for determining when to generate checkpoints of the state of executing code and the SVC. The version pressure modules of the illustrative embodiments are provided with logic for generating interrupts in the event that such version pressure thresholds are met or exceeded. In response to such interrupts, operations are performed for promoting speculative cache lines to a non-speculative state and then generating a new checkpoint. The checkpoints may be used to roll-back changes to state information of the SVC and the system in the event of a detected soft error or other failure of the executing code.

Figure 12:
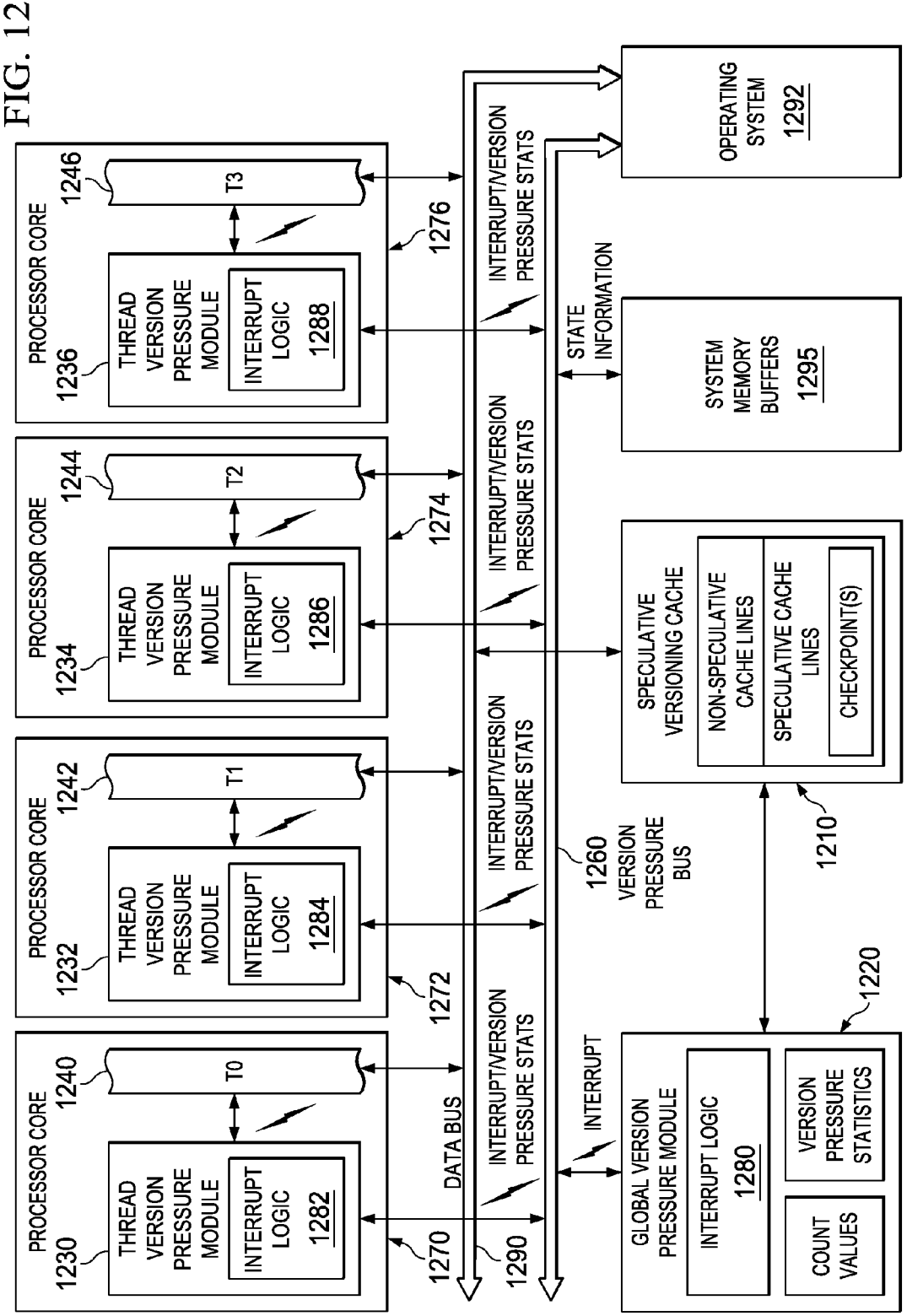
FIG. 12 is an example diagram of the version pressure modules in accordance with one illustrative embodiment in which interrupts are generated in response to one or more version pressure thresholds being met or exceeded.

As shown in FIG. 12, which is similar to FIG. 3, the version pressure modules 1220 and 1230-1236 have logic 1280-1288 for generating interrupts in the case that one or more thresholds associated with the SVC 1210 are met or exceeded. The thresholds may be communicated to the version pressure modules 1220 and 1230-1236 from the operating system 1290 and may be stored in association with the logic 1280-1288 for use in determining when to generate interrupts. These thresholds may be user specified and stored in system registers associated with the operating system or another memory location accessible by the operating system. The thresholds may be associated with particular threads, the SVC as a whole, or may be general thresholds applicable to each individual thread, cache line sets, or the like. A single threshold, or a combination of thresholds may be applied to the thread, SVC, or cache line sets.

As discussed above, such as with regard to FIG. 3, the global version pressure module 1220 may collect version pressure information for the SVC 1210 as a whole, for each individual threads, for sets of cache lines, or the like. This information may be communicated to the thread version pressure modules 1230-1236 which may then generate version pressure statistics for the individual threads. Alternatively, the global version pressure module 1220 may generate the version pressure statistics and communicate them to the thread version pressure modules 1230-1236. The statistics that are generated, either in the global or thread version pressure modules 1220 and 1230-1236, may be for the individual threads, the SVC as a whole, individual cache line sets, or the like.

The interrupt logic 1280-1288 determines if the raw version pressure information, or in other illustrative embodiments, the version pressure statistics, meet one or more version pressure thresholds. For example, at a cache-wide level, there may be a maximum of n % of the cache lines in the SVC for speculative cache lines. Moreover, at a cache line set level, an example threshold may be that there is a maximum of m % of cache lines for speculative cache lines in a given cache line set. Furthermore, at a thread level, an example threshold may be that there is a maximum of k % of cache lines for speculative cache lines for a given thread. A combination of these types of thresholds may further be used, e.g., a interrupt is generate if more than 10% overall, or up to 50% in an individual cache line set, of the cache lines is populated with speculative cache line data.

The use of such interrupt thresholds may be enabled/disabled by appropriate settings in the operating system. For example, if the compiler, operating system, or version pressure modules are taking too much time to perform threshold checks, one or more of the thresholds may be enabled/disabled to allow for better performance of the system. As another example, if the code that is being executed already has some checkpointing code embedded in it, various thresholds may be enabled/disabled so as to modify the checkpointing that is done by the version pressure modules.

The operating system 1290, and possibly the compiler (not shown), comprises logic for allocating system memory buffers 1295 to record state information that is needed to restart a process, i.e. information not in the memory or user accessible address space, e.g., special system registers, program counters, or the like. Moreover, the operating system 1290 and/or compiler has logic for promoting SVC speculative cache lines to a non-speculative state prior to entry of non-replayable code. Such logic may be provided in the form of an interrupt handler associated with the operating system, or logic in the compiler for inserting instructions into the execution code to perform such operations prior to the execution code entering a routine, module, method, or the like, that comprises non-replayable code. Moreover, this logic may further record the state as a new checkpoint and restart speculative version cache state after the non-replayable code completes execution.

In addition, the operating system 1290 and/or compiler comprises logic for verifying that interrupts are associated with checkpointed code, i.e. not non-replayable code. The operating system 1290 and/or compiler has logic for branching execution to an interrupt handler in the event that an interrupt is received and is associated with checkpointed code, such that a new checkpoint is created following promotion of speculative cache lines to a non-speculative state.

The operating system 1290, or a version pressure module 1220 or 1230-1236, when detecting a condition indicating a failure, soft error, or the like, may perform operations for recovering from such errors by rolling-back changes to a previous checkpoint. If such an error is detected, the operating system 1290 may determine if the error is detected while execution of the code is in a non-replayable code portion. Assuming that the execution of the code is not in a non-replayable code portion, a latest checkpoint for which there is certainty that the checkpoint was created prior to the error occurring is selected. Alternatively, a latest checkpoint for which there is a high likelihood that the checkpoint preceded the error may be selected. In yet another alternative, an oldest (most secure)/latest (least re-execution overhead) checkpoint may selected based on a dynamic determination of the operating system. If the interrupt is in a non-replayable code portion, then the soft error cannot be recovered from using the rollback to a known valid checkpoint and thus, the error will be propagated to the application. In this case, the application may halt or terminate while indicating to the user that an irrecoverable error has been experienced. In other cases, the application may have additional logic that allows it to recover from irrecoverable errors. For example, some applications that simulate physical phenomenon (such as weather, molecular dynamics, etc.) save intermediary results to a file on a hard disk from time to time so as to allow the user to visualize the state of the physical phenomenon being simulated. In such cases, an application that experiences such irrecoverable error has an opportunity to backtrack to the last state saved to the file and restart the entire computation from there. Such restarts may require manual intervention of the user.

If the system maintains a single previous checkpoint such selections between checkpoints are not necessary. However, it should be noted that, while the above embodiments are described in terms of a single previous checkpoint, in actuality a plurality of previous checkpoints may be maintained in the SVC if desired. For example, the previous two checkpoints may be maintained. In such a case, such selections may be performed in order to select between the various maintained checkpoints as to the one that is best to use for rolling-back to a known state.

Once a checkpoint is selected by the operating system 1290, the roll-back operation is performed by first invalidating all checkpoints that are more recent than the selected checkpoint, such as by marking their version identifiers as invalid. The state from the checkpoint is re-installed into the appropriate registers, counters, cache lines, etc. using the state information stored in the one or more buffers and the checkpoint cache line(s) in the SVC. The SVC is then restarted and the execution of the code is resumed.

Thus, the illustrative embodiments further provide mechanisms for initiating checkpoints using a SVC and one or more thresholds associated with version pressure within the SVC. Moreover, these mechanisms take into account the execution of the code entering non-replayable portions of code. Furthermore, mechanisms are provided for detecting errors or failures and generating interrupts from version pressure modules in response to the detection of such errors or failures so that appropriate operations can be performed to roll-back changes to a prior checkpoint created by the mechanisms of the illustrative embodiments.

Figure 13:
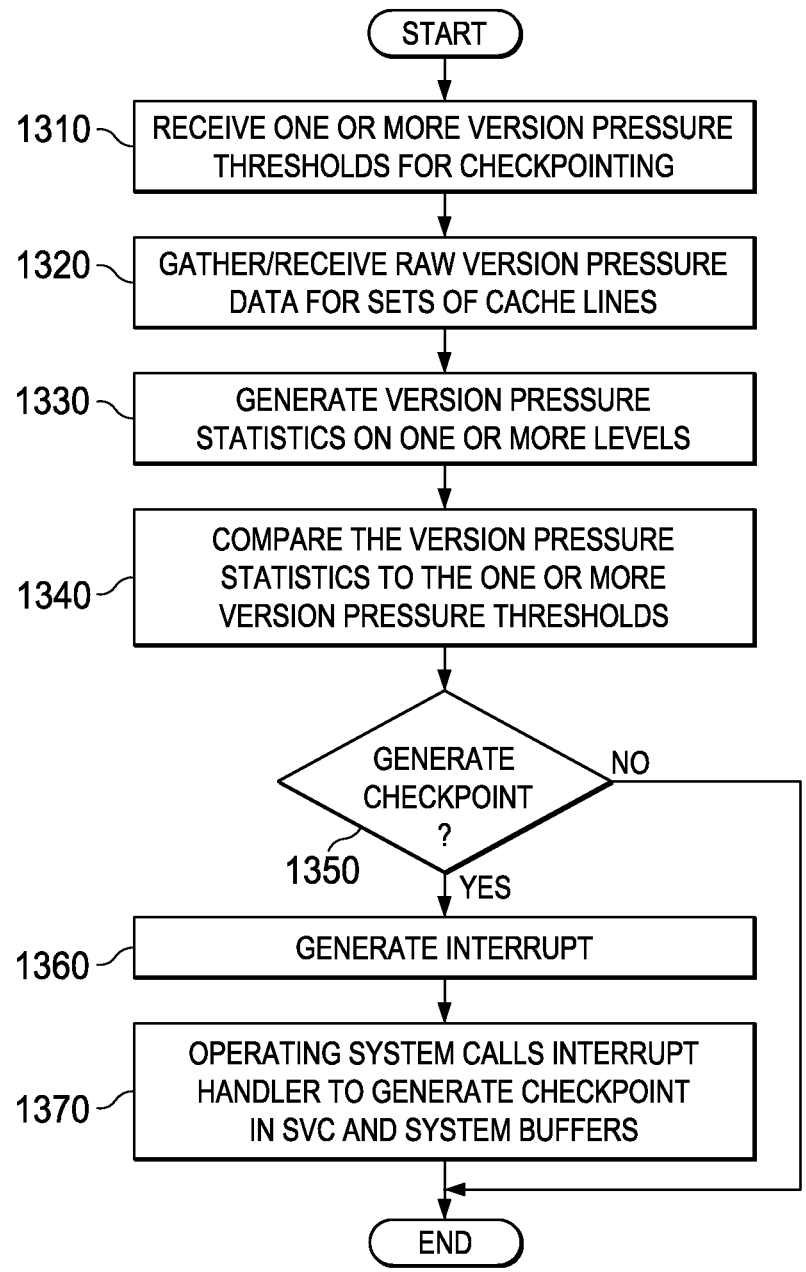
FIG. 13 is a flowchart outlining an example operation for generating an interrupt in response to one or more version pressure thresholds being met or exceeded din accordance with one illustrative embodiment.

FIG. 13 is a flowchart outlining an example operation for generating an interrupt in response to one or more version pressure thresholds being met or exceeded din accordance with one illustrative embodiment. Unless otherwise indicated, the operation and individual steps outlined in FIG. 13 may be performed, for example, in one or more of the version pressure modules of the illustrative embodiments.

As shown in FIG. 13, the operation starts by receiving one or more version pressure thresholds for performing check-pointing (step 1310). As discussed above, these thresholds may be received from the operating system, for example, and may be user defined so as to achieve a desired level of security against errors and failures.

Thereafter, raw version pressure data is gathered or received for sets of cache lines (step 1320). For example, the raw version pressure data may be gathered by the global version pressure module and distributed to the thread version pressure modules such that they receive this data from the global version pressure module. This raw version pressure data is the basis by which version pressure statistics are calculated at one or more levels, e.g., SVC level, thread level, cache line set level, etc. (step 1330). Such calculations have been previously described above with regard to various illustrative embodiments. These version pressure statistics are compared to the one or more version pressure thresholds (step 1340) and a determination is made as to whether a checkpoint should be generated (step 1350). For example, this determination may determine whether one or more of the one or more version pressure thresholds is met or exceeded indicating that a checkpoint should be generated. As noted above, in some illustrative embodiments, more than one version pressure threshold may be combined to generate a more complex condition that needs to be met or exceeded before generating a new checkpoint.

If a checkpoint is to be generated, then an interrupt is generated to the operating system indicating the need to generate a new checkpoint (step 1360). The operating system then calls an appropriate interrupt handler to generate a checkpoint in the SVC and system buffers (step 1370). That is, the checkpoint involves storing checkpoint cache lines in a speculative portion of the SVC and storing state information not maintained in the SVC, in system memory buffers for later use should a roll-back operation be required. The operation then terminates.

FIG. 14 is a flowchart outlining an example operation for generating checkpoints in accordance with one illustrative embodiment. Unless otherwise indicated, the operation and individual steps outlined in FIG. 13 may be performed, for example, in an interrupt handler, the operating system, or the like, of the illustrative embodiments.

As shown in FIG. 14, the operation starts by suspending the execution of the code (step 1410). Speculative cache lines in the SVC are promoted to a non-speculative state (step 1420). A checkpoint is generated by generating checkpoint cache line(s) as speculative cache lines in the SVC (step 1430) and storing checkpoint information in system memory buffers (step 1440). The execution of the code is then restarted (step 1450) and the operation terminates. As previously explained, step 1430 consists in generating a new speculative version id (VID) associated with the thread, so that any future store/write operation generated by the thread will be marked as speculative under that new VID.

FIG. 15 is a flowchart outlining an example operation for performing a roll-back operation in accordance with one illustrative embodiment. The operation outlined in FIG. 15 may be performed by or in association with the operating system. For example, operations 1510 and 1520 may be performed by a version pressure module while the other operations may be performed by the operating system. Alternatively, all of the operations may be performed by the operating system.

As shown in FIG. 15, the operation starts with the detection of an error in the data stored in the SVC or a failure of the executing code (step 1510). As mentioned above, this error may be a soft error due to gamma rays or other error sources causing bits to flip in the SVC, for example. In response to detecting an error or failure, a determination is made as to whether the error occurred due to execution of code in a non-replayable portion of the code (step 1520). If so, then a notification and/or interrupt is generated indicating that the error is a non-recoverable error (step 1530) and then normal interrupt handling for non-recoverable errors is performed, e.g., termination of the application, invoking recovery logic for recovering to a user level checkpoint, or the like (not shown). If the error/failure is not due to execution of code in a non-replayable portion of code, then an interrupt is generated to the operating system (step 1540). A previous checkpoint is selected for use in performing a roll-back operation (step 1550). As described previously, such a selection may be avoided if only one previous checkpoint is maintained by the system. However, if more than one previous checkpoint is maintained, then the checkpoint that is most certainly before the error/failure occurred and which minimizes the amount of re-execution necessary is selected.

Once a checkpoint is selected, the roll-back operation is performed using the state information stored in the checkpoint cache line(s) in the SVC and the state information in the system memory buffers for the selected checkpoint (step 1560). Have restored the state to the point in time of the checkpoint, the execution of the code is then restarted (step 1570) and the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating checkpoints in a speculative versioning cache of the data processing system, the method comprising:
    executing, by at least one processor of the data processing system, code within the data processing system, wherein the code accesses cache lines in the speculative versioning cache;
    determining, by the data processing system, whether a first condition occurs indicating a need to generate a checkpoint in the speculative versioning cache, wherein the checkpoint is one or more speculative cache lines which store state information for purposes of performing a roll-back operation to invalidate changes to cache lines corresponding to the one or more speculative cache lines in response to a second condition occurring; and
    generating the checkpoint in the speculative versioning cache in response to a determination that the first condition has occurred, wherein the speculative versioning cache is a cache that stores multiple versions of a same cache content, one for each speculative execution, and wherein the speculative versioning cache comprises a first portion for storing non-speculative cache lines associated with read/load operations and a second portion for storing speculative cache lines associated with write/store operations.

2. The method of claim 1, further comprising storing, in the data processing system, one or more version pressure thresholds associated with the speculative versioning cache, wherein determining whether a first condition occurs indicating a need to generate a checkpoint in the speculative versioning cache comprises determining, while the code is executing, whether or not a version pressure of the speculative versioning cache meets or exceeds the one or more version pressure thresholds.

3. The method of claim 2, wherein the one or more version pressure thresholds comprise one or more thresholds at one of a speculative versioning cache level, a set of associated cache lines level, and an individual thread level.

4. The method of claim 2, wherein determining whether or not a version pressure of the speculative versioning cache meets or exceeds the one or more version pressure thresholds is performed by one or a global version pressure module or a thread version pressure module associated with the speculative versioning cache.

5. The method of claim 1, wherein the second portion has a maximum size limit based on a total capacity of the speculative versioning cache, and wherein determining whether a first condition occurs indicating a need to generate a checkpoint in the speculative versioning cache comprises determining whether or not a number of cache lines in the second portion of the speculative versioning cache meets or exceeds a version pressure threshold that is based on the maximum size limit.

6. The method of claim 1, wherein the second condition is detection of a soft error in cached data in the speculative versioning cache.

7. The method of claim 1, wherein generating a checkpoint in the speculative versioning cache comprises:
    generating an interrupt to the operating system in response to the determination that the first condition has occurred; and
    initiating, by the operating system, an interrupt handler for promoting speculative cache lines in the speculative versioning cache to a non-speculative state and initiating creation of the checkpoint in the speculative versioning cache.

8. The method of claim 7, wherein promoting speculative cache lines in the speculative versioning cache comprises labeling a version identifier associated with speculative cache lines in the speculative versioning cache as non-speculative and invalidating prior non-speculative versions of corresponding cache lines.

9. The method of claim 1, wherein determining whether a first condition occurs indicating a need to generate a checkpoint in the speculative versioning cache comprises determining whether execution of code is entering a non-replayable portion of the code, and wherein in response to a determination that the execution of code is entering the non-replayable portion of code, generating the checkpoint.

10. The method of claim 9, wherein the non-replayable code is code that performs one of an input or output operation, reading or writing to a file, sending or receiving a message over a network, sharing of data with another thread, or accessing a lock on a resource.

11. The method of claim 9, wherein generating the checkpoint in the speculative versioning cache in response to a determination that the first condition has occurred comprises:
    executing one or more first compiler inserted instructions prior to the non-replayable code that cause a first interrupt to be generated for promoting speculative cache lines in the speculative versioning cache to a non-speculative state; and
    executing one or more second compiler inserted instructions after the non-replayable code that cause a second interrupt to be generated for generating the checkpoint after execution of the non-replayable code.

12. The method of claim 1, wherein generating the checkpoint comprises:
    generating a new version identifier (VID);
    associating the new VID with a current thread executing as part of executing the code; and
    utilizing, by the current thread, the new VID during subsequent stores to the speculative versioning cache.

13. The method of claim 12, wherein utilizing the new VID during subsequent stores to the speculative versioning cache comprises:
    determining if a store operation of the current thread results in a cache hit in the speculative versioning cache;
    checking, in response to a cache hit, whether the cache line hit by the store operation is associated with the new VID; and
    in response to the cache line hit by the store operation not being associated with the new VID, copying the cache line hit by the store operation to a new speculative cache line, associating the new VID with the new speculative cache line, and performing the store operation to the new speculative cache line.

14. The method of claim 1, wherein generating the checkpoint comprises storing first state information in a speculative cache line in the speculative versioning cache and storing second state information in one or more buffers of the data processing system.

15. The method of claim 14, wherein the first state information is non-speculative state information of a non-speculative cache line corresponding to the speculative cache line, and wherein the second state information comprises one or more of a state of a program counter, state of program registers, or a state of system registers.

16. The method of claim 1, further comprising:
    determining if the second condition occurs during execution of the code;
    determining if the second condition occurred during execution of a non-replayable portion of the code; and
    in response to the second condition not occurring during execution of the non-replayable portion of the code, rolling back changes to the cache line corresponding to the speculative cache line, to a state corresponding to the checkpoint.

17. The method of claim 16, further comprising:
    generating a notification or interrupt indicating a non-recoverable error in response to determining that the second condition occurred during execution of the non-replayable portion of the code.

18. A computer program product comprising a non-transitory computer readable storage medium having a computer readable program recorded thereon, wherein the computer readable program, when executed on a data processing system, causes the data processing system to:
    execute code within the data processing system, wherein the code accesses cache lines in a speculative versioning cache of the data processing system;
    determine whether a first condition occurs indicating a need to generate a checkpoint in the speculative versioning cache, wherein the checkpoint is one or more speculative cache lines which store state information for purposes of performing a roll-back operation to invalidate changes to cache lines corresponding to the one or more speculative cache lines in response to a second condition occurring; and
    generate the checkpoint in the speculative versioning cache in response to a determination that the first condition has occurred, wherein the speculative versioning cache is a cache that stores multiple versions of a same cache content, one for each speculative execution, and wherein the speculative versioning cache comprises a first portion for storing non-speculative cache lines associated with read/load operations and a second portion for storing speculative cache lines associated with write/store operations.

19. The computer program product of claim 18, wherein the computer readable program further causes the data processing system to store one or more version pressure thresholds associated with the speculative versioning cache, and wherein the computer readable program causes the data processing system to determine whether a first condition occurs indicating a need to generate a checkpoint in the speculative versioning cache by determining, while the code is executing, whether or not a version pressure of the speculative versioning cache meets or exceeds the one or more version pressure thresholds.

20. The computer program product of claim 18, wherein the computer readable program causes the data processing system to generate a checkpoint in the speculative versioning cache by:
    generating an interrupt to the operating system in response to the determination that the first condition has occurred; and
    initiating, by the operating system, an interrupt handler for promoting speculative cache lines in the speculative versioning cache to a non-speculative state and initiating creation of the checkpoint in the speculative versioning cache.

21. The computer program product of claim 18, wherein the computer readable program causes the data processing system to determine whether a first condition occurs indicating a need to generate a checkpoint in the speculative versioning cache by determining whether execution of code is entering a non-replayable portion of the code, and wherein in response to a determination that the execution of code is entering the non-replayable portion of code, generating the checkpoint.

22. A data processing system, comprising:
    one or more processors, each processor having at least one thread level versioning cache module implemented in hardware of the processor;
    a speculative versioning cache storage device coupled to the one or more processors;
    a hardware implemented global versioning cache module coupled to the speculative versioning cache storage device, wherein:

the one or more processors are configured to execute code that accesses cache lines in the speculative versioning cache storage device;

at least one of the hardware implemented global versioning cache module or the at least one thread level versioning cache module is configured to determine whether a first condition occurs indicating a need to generate a checkpoint in the speculative versioning cache, wherein the checkpoint is one or more speculative cache lines which store state information for purposes of performing a roll-back operation to invalidate changes to cache lines corresponding to the one or more speculative cache lines in response to a second condition occurring; and the speculative versioning cache storage device is configured to store the checkpoint in response to a determination that the first condition has occurred, wherein the speculative versioning cache is a cache that stores multiple versions of a same cache content, one for each speculative execution, and wherein the speculative versioning cache comprises a first portion for storing non-speculative cache lines associated with read/load operations and a second portion for storing speculative cache lines associated with write/store operations.

23. The data processing system of claim 22, wherein at least one of the hardware implemented global versioning cache module or the at least one thread level versioning cache module is further configured to store one or more version pressure thresholds associated with the speculative versioning cache, and wherein the at least one of the hardware implemented global versioning cache module or the at least one thread level versioning cache module is configured to determine whether a first condition occurs indicating a need to generate a checkpoint in the speculative versioning cache by determining, while the code is executing, whether or not a version pressure of the speculative versioning cache meets or exceeds the one or more version pressure thresholds.

24. The data processing system of claim 22, wherein the at least one of the hardware implemented global versioning cache module or the at least one thread level versioning cache module is configured to determine whether a first condition occurs indicating a need to generate a checkpoint in the speculative versioning cache by determining whether execution of code is entering a non-replayable portion of the code, and wherein in response to a determination that the execution of code is entering the non-replayable portion of code, generating the checkpoint.

* * * * *